United States Patent
Merrill et al.

(10) Patent No.: US 7,316,558 B2
(45) Date of Patent: *Jan. 8, 2008

(54) DEVICES FOR STRETCHING POLYMER FILMS

(75) Inventors: William W. Merrill, White Bear Lake, MN (US); Jeffery N. Jackson, Woodbury, MN (US); Andrew T. Ruff, Mendota Heights, MN (US); Desiree L. Thompson, Prescott, WI (US); John A. Wheatley, Lake Elmo, MN (US); Jeffrey D. Amundson, Hudson, WI (US); Curtis A. Harvey, St. Francis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/461,837

(22) Filed: Aug. 2, 2006

(65) Prior Publication Data
US 2006/0257515 A1   Nov. 16, 2006

Related U.S. Application Data

(63) Continuation of application No. 11/010,774, filed on Dec. 13, 2004, now Pat. No. 7,104,776, which is a continuation of application No. 10/306,591, filed on Nov. 27, 2002, now Pat. No. 6,949,212.

(51) Int. Cl.
*B29C 55/08* (2006.01)
(52) U.S. Cl. ............... 425/325; 425/363; 425/DIG. 41
(58) Field of Classification Search .............. 425/325, 425/363, DIG. 41; 26/72, 89, 92, 99, 106, 26/71, 79
See application file for complete search history.

(56) References Cited

U.S. PATENT DOCUMENTS

| 2,473,404 | A |   | 6/1949  | Young            |         |
|-----------|---|---|---------|------------------|---------|
| 2,618,012 | A |   | 11/1952 | Milne            |         |
| 2,998,772 | A |   | 9/1961  | Land             |         |
| 3,055,048 | A | * | 9/1962  | Koppehele        | 26/72   |
| 3,150,433 | A | * | 9/1964  | Kampf            | 26/73   |
| 3,193,873 | A |   | 7/1965  | Weinand          |         |
| 3,502,766 | A |   | 3/1970  | Tsuruta et al.   |         |
| 3,577,586 | A |   | 5/1971  | Kalwaites et al. |         |

(Continued)

FOREIGN PATENT DOCUMENTS

DE       1259558 B      1/1968

(Continued)

OTHER PUBLICATIONS

Weber, Michael F., et al., "Giant Birefringent Optics in Multilayer Polymer Mirrors," *Science*, vol. 287, pp. 2451-2456 (Mar. 31, 2000).

(Continued)

*Primary Examiner*—Yogendra N. Gupta
*Assistant Examiner*—Emmanuel S. Luk

(57) ABSTRACT

Stretched polymeric films can be used in a variety of applications, including optical applications. The stretching conditions and shape of the stretching tracks in a stretching apparatus can determine or influence film properties. Methods and stretching apparatuses can include adjustable or zone-defined stretching regions.

20 Claims, 13 Drawing Sheets

U.S. PATENT DOCUMENTS

| | | | |
|---|---|---|---|
| 3,807,004 A | 4/1974 | Andersen | |
| 3,890,421 A | 6/1975 | Habozit | |
| 4,330,499 A | 5/1982 | von und zu Aufsesse et al. | |
| 4,349,500 A | 9/1982 | Yazawa et al. | |
| 4,434,128 A | 2/1984 | Okada et al. | |
| 4,525,317 A | 6/1985 | Okada et al. | |
| 4,853,602 A * | 8/1989 | Hommes et al. | 318/38 |
| 4,862,564 A | 9/1989 | Kwack | |
| 5,043,036 A | 8/1991 | Swenson | |
| 5,072,493 A | 12/1991 | Hommes et al. | |
| 5,517,737 A | 5/1996 | Viltro et al. | |
| 5,560,793 A | 10/1996 | Ruscher et al. | |
| 5,699,188 A | 12/1997 | Gilbert et al. | |
| 5,771,547 A * | 6/1998 | Hommes et al. | 26/93 |
| 5,783,120 A | 7/1998 | Ouderkirk et al. | |
| 5,825,543 A | 10/1998 | Ouderkirk et al. | |
| 5,826,314 A | 10/1998 | Aihara et al. | |
| 5,867,316 A | 2/1999 | Carlson et al. | |
| 5,882,574 A | 3/1999 | Geisinger | |
| 5,962,114 A | 10/1999 | Jonza et al. | |
| 5,965,247 A | 10/1999 | Jonza et al. | |
| 6,057,961 A | 5/2000 | Allen et al. | |
| 6,096,375 A | 8/2000 | Ouderkirk et al. | |
| 6,111,696 A | 8/2000 | Allen et al. | |
| 6,113,811 A | 9/2000 | Kausch et al. | |
| 6,179,948 B1 | 1/2001 | Merrill et al. | |
| 6,368,699 B1 | 4/2002 | Gilbert et al. | |
| 6,916,440 B2 | 7/2005 | Jackson et al. | |
| 6,939,499 B2 | 9/2005 | Merrill et al. | |
| 7,104,776 B2 * | 9/2006 | Merrill et al. | 425/325 |
| 2002/0180107 A1 | 12/2002 | Jackson et al. | |
| 2002/0190406 A1 | 12/2002 | Merrill et al. | |

FOREIGN PATENT DOCUMENTS

| | | |
|---|---|---|
| DE | 1206575 B | 12/1985 |
| EP | 0 236 171 A1 | 9/1987 |
| JP | 66-013634 | 7/1966 |
| JP | 55-077530 | 6/1980 |
| JP | 55-077530 | 8/1980 |
| JP | 56-49223 | 5/1981 |
| JP | 61-227019 | 10/1986 |
| JP | 2-89006 | 3/1990 |
| JP | 3-124426 | 5/1991 |
| JP | 3-182701 | 8/1991 |
| JP | 5-241021 | 2/1992 |
| JP | 5-288931 | 4/1992 |
| JP | 5-288932 | 4/1992 |
| JP | 5-11113 | 1/1993 |
| JP | 5-11114 | 1/1993 |
| JP | 5-150115 | 1/1993 |
| JP | 6-27321 | 2/1994 |
| JP | 6-34815 | 2/1994 |
| JP | 6-43321 | 2/1994 |
| JP | 6-51116 | 2/1994 |
| JP | 6-51119 | 2/1994 |
| WO | WO 95/17303 | 6/1995 |
| WO | WO 96/19347 | 6/1996 |
| WO | WO 99/36248 | 7/1999 |
| WO | WO 99/36812 | 7/1999 |
| WO | WO 00/29197 | 5/2000 |

OTHER PUBLICATIONS

U.S. Appl. No. 09/871,130, filed May 31, 2001, "Optical Devices Using Reflecting Polarizing Materials" (now issued as 6,829,071, issued Dec. 7, 2004).

U.S. Appl. No. 09/686,460, filed Oct. 11, 2000, "An Improved Optical Device Having Continuous and Disperse Phases".

U.S. Appl. No. 60/294,940, filed May 31, 2001, "Processes and Apparatus for Making Transversely Drawn Films with Substantially Uniaxial Character".

* cited by examiner

DEVICES FOR STRETCHING POLYMER FILMS

CROSS REFERENCE TO RELATED APPLICATIONS

This application is a continuation of U.S. Ser. No. 11/010,774, filed Dec. 13, 2004, now issued as U.S. Pat. No. 7,104,776 on Sep. 12, 2006, which is a continuation of U.S. Ser. No. 10/306,591, filed Nov. 27, 2002, now issued as U.S. Pat. No. 6,949,212 on Sep. 27, 2005, the disclosures of which are herein incorporated by reference.

FIELD OF THE INVENTION

Generally, the present invention relates to methods and devices for stretching polymer films and the films obtained by the methods and devices. The present invention also relates to methods and devices for stretching polymer films using an adjustable or zone-defined stretching region.

BACKGROUND OF THE INVENTION

There are a variety of reasons to stretch polymer films. Stretching can enhance or generate desired mechanical, optical, and other film properties. For example, polymer films can be stretched to provide a desired degree of uniaxial or near uniaxial orientation in optical properties. In general, perfect uniaxial orientation of a birefringent polymer results in a film (or layers of a film) in which the index of refraction in two of three orthogonal directions is the same (for example, the width (W) and thickness (T) direction of a film, as illustrated in FIG. 4). The index of refraction in the third direction (for example, along the length (L) direction of the film) is different from the indices of refraction in the other two directions. Typically, perfect uniaxial orientation is not required and some degree of deviation from the optimal conditions can be allowed depending on a variety of factors including the end-use application of the polymer film.

In optical applications, a uniaxially oriented film can provide useful optical properties such as more uniform performance across a variety of different viewing angles. Other applications can also benefit from uniaxial or near uniaxial orientation of a polymer film. For example, uniaxially oriented films are more easily fibrillated or torn along the orientation direction.

SUMMARY OF THE INVENTION

Generally, the present invention relates to methods and devices for stretching polymer films. One embodiment is an apparatus for stretching a film. The apparatus includes a plurality of gripping elements to hold opposing ends of a film, opposing tracks along which the plurality of gripping elements travel, and at least one track shape controller. The opposing tracks define a primary stretching region in which the tracks generally diverge to stretch a film held by the gripping elements. Each of the opposing tracks in the primary stretching region includes at least one continuous rail extending the length of the track through the primary stretching region. The track shape controller(s) is coupled to at least one of the continuous rails within the primary stretching region and is capable of applying a force to the continuous rail to modify a shape of the track in the primary stretching region.

Another embodiment is a method of stretching a film using this apparatus. In the method at least one of the track shape controllers is activated to apply a force to at least one of the continuous rails to modify a shape of at least one of the tracks. The opposing ends of the film are gripped using the gripping elements. The film is conveyed along the opposing tracks to the primary stretching region. The film is then stretched within the primary stretching region.

Yet another embodiment is an apparatus for stretching a film. The apparatus includes a plurality of gripping elements to hold opposing ends of a film and opposing tracks along which the plurality of gripping elements travel. The opposing tracks define a primary stretching region in which the tracks generally diverge to stretch a film held by the gripping elements. The primary stretching region includes (i) an initial stretching zone configured and arranged so that the machine direction draw ratio (MDDR) and the transverse direction draw ratio (TDDR) based on the tracks have the following relationship:

$$MDDR < (TDDR)^{-1/2}$$

and TDDR is increased by at least 0.5; and (ii) a later stretching zone configured and arranged so that MDDR is approximately equal to $(TDDR)^{-1/2}$ and TDDR is increased by at least 0.5. Another embodiment is the method of stretching the film using this apparatus.

Still another embodiment of the invention is a method for stretching a film. The method includes conveying the film into a stretching region. The film is then stretched to increase a transverse dimension of the film by greater than a factor of 4 by conveying the opposing edges of the film along generally diverging paths. The generally diverging paths are configured and arranged to provide a machine direction draw ratio (MDDR) and a transverse direction draw ratio (TDDR) based on the paths having the following relationship:

$$MDDR < (TDDR)^{-1/2}$$

during the stretching. The paths can be coplanar, if desired.

Another embodiment is of the invention is a method for stretching a film. The method includes conveying the film into a stretching region. The film is then stretched to increase a transverse dimension of the film by at least a factor of 2.5 by conveying the opposing edges of the film along generally diverging, coplanar paths. The generally diverging paths are configured and arranged to provide a machine direction draw ratio (MDDR) and a transverse direction draw ratio (TDDR) based on the paths having the following relationships:

$$MDDR < (TDDR)^{-1/2}$$

$$1/(MDDR \times TDDR^{1/2}) < 2$$

during the stretching.

Yet another embodiment of the invention is a method for stretching a film. The method includes conveying the film into a stretching region. The film is then stretched to increase a transverse dimension of the film by at least a factor of 4.6 by conveying the opposing edges of the film along generally diverging, coplanar paths. The generally diverging paths are configured and arranged to provide a machine direction draw ratio (MDDR) and a transverse direction draw ratio (TDDR) based on the paths having the following relationships:

$$0.9*MDDR < (TDDR)^{-1/2}$$

$$1/(MDDR \times TDDR^{1/2}) < 2$$

during the stretching.

One embodiment of the invention is a method for stretching a film. The method includes conveying the film into a stretching region. The film is then stretched by conveying the opposing edges of the film along generally diverging paths. The generally diverging paths are configured and arranged to comprise (i) an initial stretching zone wherein the generally diverging paths have a functional form corresponding to $$\pm(x)/(x_1)=(\frac{1}{4})(x_1/x_0)(y/x_1)^2+1$$

and (ii) a later stretching zone wherein the generally diverging paths have a functional form corresponding to $$\pm(x)/(x_2)=(\frac{1}{4})(x_2/x_0)((y-A)/x_2)^2+1,$$

where $x_2$ and $x_1$ are different and A is a y-axis offset.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
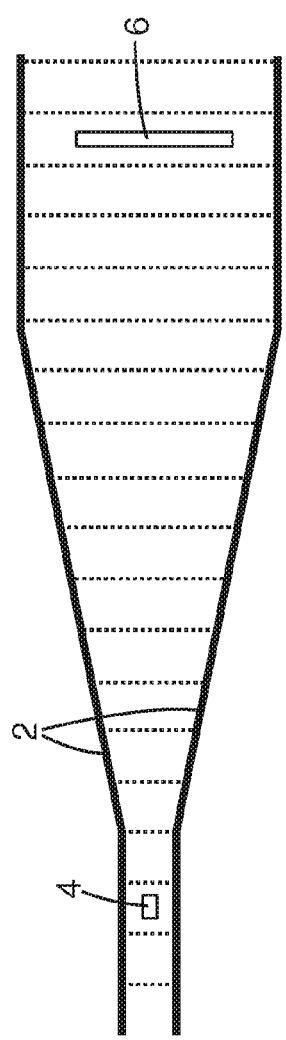
FIG. 1 is a schematic top view of a prior art tenter apparatus used to stretch film.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to methods and devices for stretching polymer films and the films made using the methods and devices. In addition, the present invention is directed to methods and devices for stretching polymer films that include an adjustable or zone-defined stretching region. The polymer films can be stretched using these methods and devices to achieve uniaxial or near uniaxial orientation, if desired. The methods and devices can also be used to achieve other orientation conditions.

The present invention is applicable generally to a number of different polymer films, materials, and processes. The present invention is believed to be particularly suited to the fabrication of polymer optical films. The methods and devices can be used, if desired, to make optical films or other films having one or more properties selected from improved optical performance, improved optical properties, increased propensity to fracture or tear in a controlled manner or direction, enhanced dimensional stability, better processability, easier manufacturability, and lower cost when compared to optical films made using conventional methods and devices.

A variety of optical films can be stretched or drawn according to the present invention. The films can be single or multi-layer films. Suitable films are disclosed, for example, in U.S. Pat. Nos. 5,699,188; 5,825,543; 5,882,574; 5,965,247; and 6,096,375; and PCT Patent Applications Publication Nos. WO 95/17303; WO 96/19347; WO 99/368

12; and WO 99/36248 (the entire contents of each of which are herein incorporated by reference). The devices and methods described herein include improvements, additions, or alterations to the devices and methods described in U.S. Pat. Nos. 6,939,499 and 6,916,440 and U.S. Provisional Patent Application Ser. No. 60/294,490, all of which are incorporated herein by reference.

Films made in accordance with the present invention may be useful for a wide variety of products including, for example, polarizers, reflective polarizers, dichroic polarizers, aligned reflective/dichroic polarizers, absorbing polarizers, and retarders (including z-axis retarders). The polymer films can be monolithic or multilayer polymer films. The polymeric films may also comprise layers of immiscible blends that form optical effects such as diffusers or diffuse reflective polarizers, such as described in U.S. Pat. Nos. 5,783,120; 5,825,543; 5,867,316; 6,057,961; 6,111,696; 6,179,948: 6,829,071 and 6,654,170, all of which are incorporated herein by reference. These polymer films can include coatings or additional layers that are provided before or after drawing. Examples of some suitable coatings and layers are described in U.S. Pat. No. 6,368,699, incorporated herein by reference. In some embodiments, the polymer films include additional polarizing elements such as melt extrudable orienting dyes, wire grid polarizing elements, and the like. One example of a useful construction is a film with a layer of polyvinyl alcohol (PVA) that is formed on the film. e.g. coated on the film prior to or after stretching the flint The PVA can be post-processed to form a dichroic polarizing layer, e.g. through an iodine staining, acid dehydration or dye embedding methods. The substrate may itself be a monolithic film or a multilayer construction with or without optical reflective power. Examples of PVA films suitable for use in this construction can be found in U.S. Pat. No. 6,113,811, which is incorporated herein by reference.

One application of the particular films of the invention is as a component in devices such as, for example, polarizing beamsplitters for front and rear projection systems or as a brightness enhancement film used in a display (for example, a liquid crystal display) or microdisplay. It should also be noted that the stretcher described below in accordance with the present invention may be used with a length orienter to make a mirror.

Figure 4:
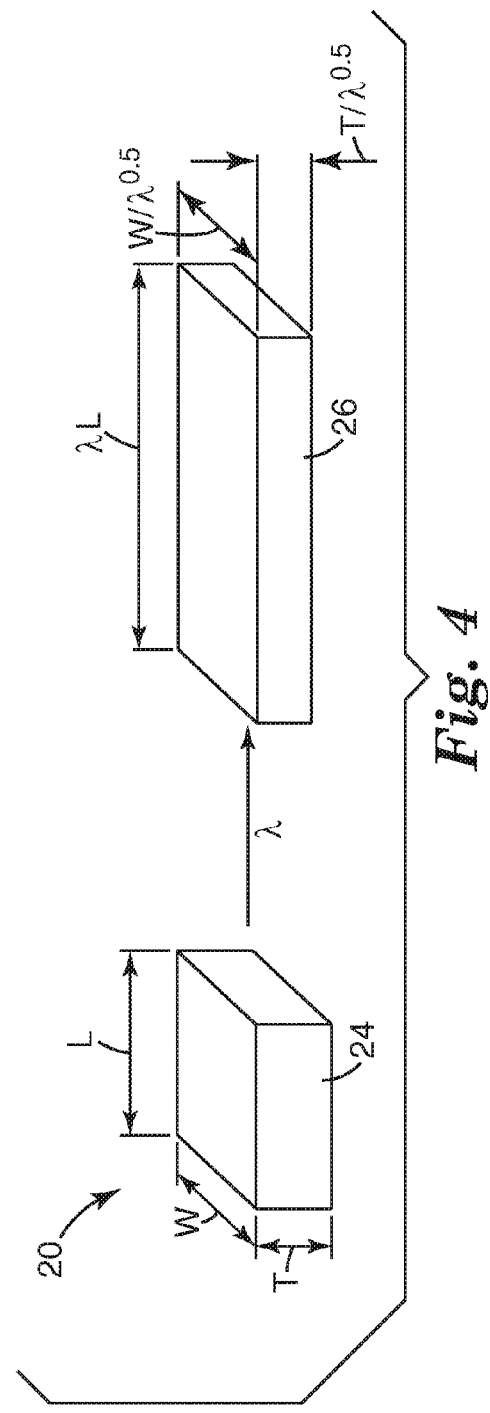
FIG. 4 is a perspective view of a portion of film in a uniaxial stretching process both before and after the stretching process.
Figure 5:
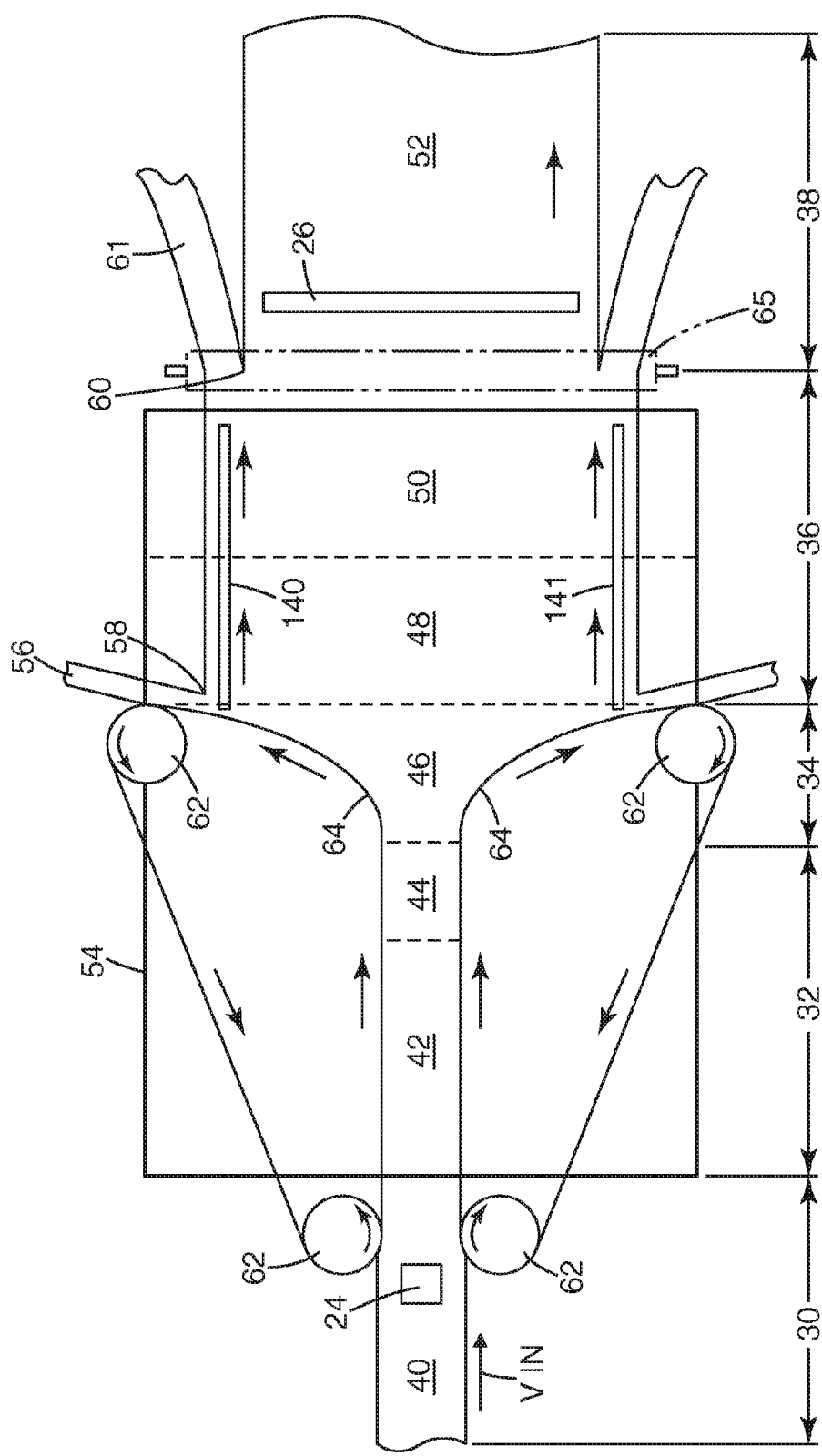
FIG. 5 is a schematic illustration of one embodiment of the stretching process and one embodiment of a stretching apparatus according to the present invention.

In general, the process includes stretching a film that can be described with reference to three mutually orthogonal axes corresponding to the machine direction (MD), the transverse direction (TD), and the normal direction (ND). These axes correspond to the width, length, and thickness of the film, as illustrated in FIG. 4. The stretching process stretches a region 20 of the film from an initial configuration 24 to a final configuration 26. The machine direction is the general direction along which the film travels through a stretching device, for example, the apparatus as illustrated in FIG. 5. The transverse direction is the second axis within the plane of the film and is orthogonal to the machine direction. The normal direction is orthogonal to both MD and TD and corresponds generally to the thickness dimension of the polymer film.

Figure 3:
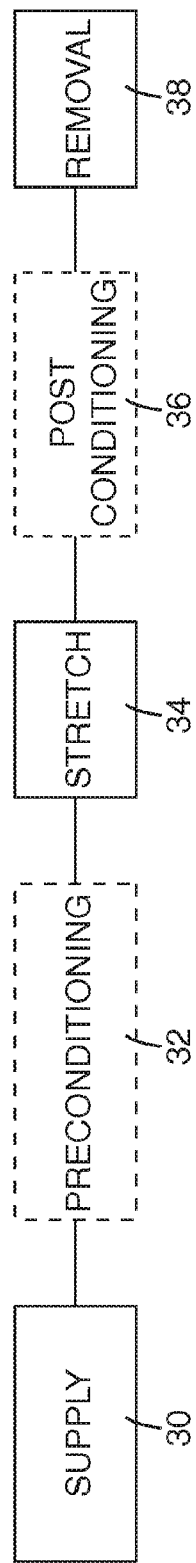
FIG. 3 is a block diagram showing steps according to one aspect of the present invention.

FIG. 3 is a block diagram of a process according to the present invention. In step 30, the film is supplied or provided to an apparatus for stretching the film. The process optionally includes a preconditioning step 32. The film is stretched in step 34. The film is optionally post-conditioned in step 36. The film is removed from the stretching apparatus in step 38.

FIG. 5 illustrates one embodiment of a stretching apparatus and method of the invention. It will be recognized that the process illustrated by FIG. 3 can be accomplished using one or more additional apparatuses, apart from a stretching apparatus (which at a minimum performs step 34 of FIG. 3). These one or more additional apparatuses perform one or more of the non-stretching functions (for example, functions represented by steps 30, 32, 36 and 38) illustrated in FIG. 3 and shown in FIG. 5 as being performed by a stretching apparatus.

In the illustrated embodiment of FIG. 5, the apparatus includes a region 30 where the film 40 is introduced into the stretching apparatus. The film can be provided by any desirable method. For example, the film can be produced in a roll or other form and then provided to stretching apparatus. As another example, the stretching apparatus can be configured to receive the film from an extruder (if, for example, the film is generated by extrusion and ready for stretching after extrusion) or a coater (if, for example, the film is generated by coating or is ready for stretching after receiving one or more coated layers) or a laminator (if, for example the film is generated by lamination or is ready for stretching after receiving one or more laminated layers).

Generally, the film 40 is presented in region 30 to one or more gripping members that are configured and arranged to hold opposing edges of the film and convey the film along opposing tracks 64 defining predetermined paths. The gripping members 70 (see FIG. 7) typically hold the film at or near the edges of the film. The portions of the film held by the gripping members are often unsuitable for use after stretching so the position of the gripping members is typically selected to provide sufficient grip on the film to permit stretching while controlling the amount of waste material generated by the process.

One example of suitable gripping members includes a series of clips that sequentially grip the film between opposing surfaces and then travel around a track. The gripping members can nest or ride in a groove or a channel along the track. Another example is a belt system that holds the film between opposing belts or treads, or a series of belts or treads, and directs the film along the track. Belts and treads can, if desired, provide a flexible and continuous, or semi-continuous, film conveyance mechanism. A variety of opposing, multiple belt methods are described, for example, in U.S. Pat. No. 5,517,737 or in European Patent Application Publication No. 0236171 A1 (the entire contents of each of which are herein incorporated by reference). The tension of belts is optionally adjustable to obtain a desired level of gripping.

A belt or clip can be made of any material. For example, a belt can be a composite construction. One example of a suitable belt includes an inner layer made of metal, such as steel, to support high tension and an outer layer of elastomer to provide good gripping. Other belts can be used. In some embodiments, the belt includes discontinuous tread to provide good gripping.

Other methods of gripping and conveying the film through a stretcher are known and may be used. In some embodiments, different portions of the stretching apparatus can use different types of gripping members.

Gripping members, such as clips, can be directed along the track by, for example, rollers 62 rotating a chain along the track with the gripping members coupled to the chain. The rollers are connected to a driver mechanism that controls the speed and direction of the film as it is conveyed through the stretching apparatus. Rollers can also be used to rotate and control the speed of belt-type gripping members. The belts and rollers optionally include interlocking teeth to reduce or prevent slippage between the belt and roller.

Figure 6:
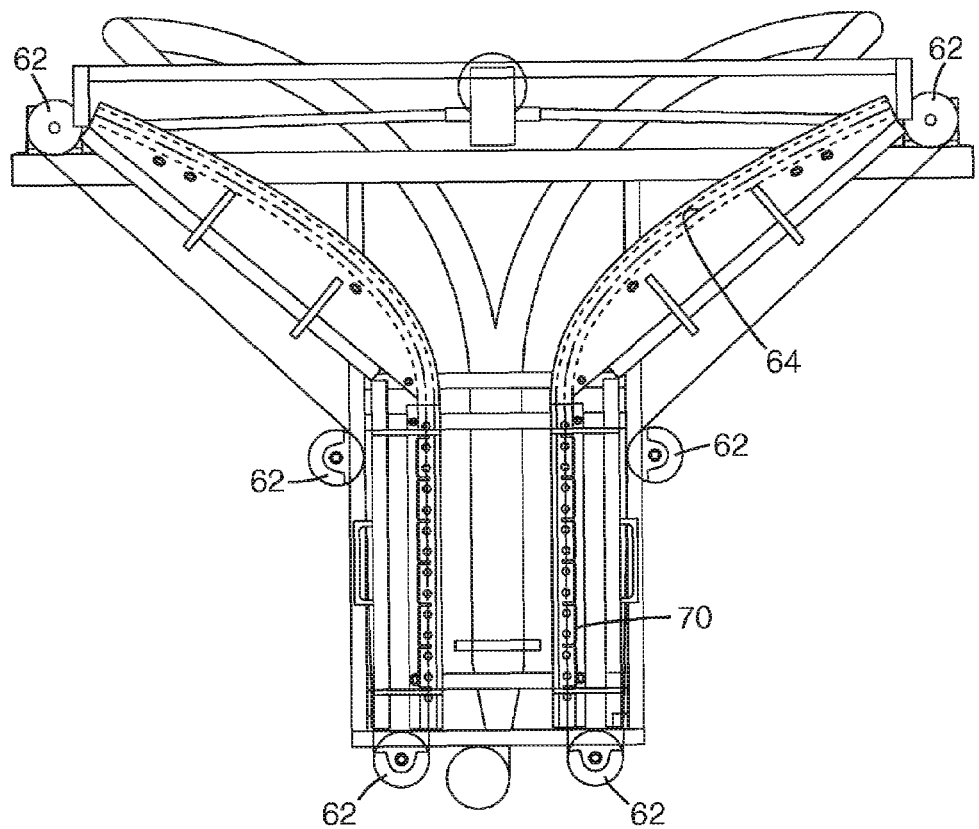
FIG. 6 is a schematic top view of a portion of a stretching apparatus according to the present invention.
Figure 7:
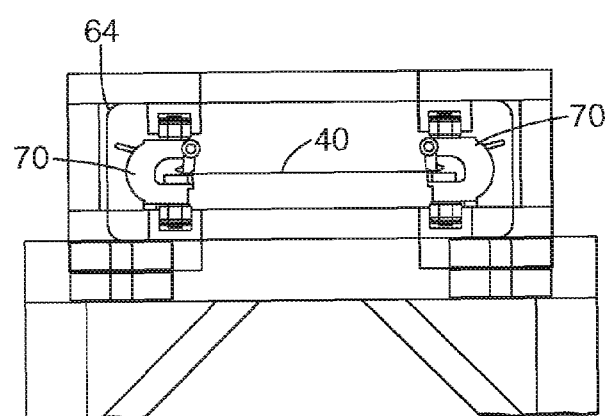
FIG. 7 is an end view of the apparatus of FIG. 6.

FIGS. 6 and 7 illustrate one embodiment of the gripping members and track. The gripping members 70 of this embodiment are a series of tenter clips. These clips can afford overall flexibility via segmentation. The discrete clips are typically closely packed and attached to a flexible structure such as a chain. The flexible structure rides along or in channels along the track 64. Strategically placed cams and cam surfaces open and close the tenter clips at desired points. The clip and chain assembly optionally ride on wheels or bearings or the like. As one example, the gripping members are tenter clips mounted on top and bottom bearings rolling between two pairs of inner and outer rails. These rails form, at least in part, the track.

The edges of the gripping members define a boundary edge for the portion of the film that will be stretched. The motion of the gripping members along the tracks provides a boundary trajectory that is, at least in part, responsible for the motion and drawing of the film. Other effects (e.g., downweb tension and take-up devices) may account for other portions of the motion and drawing. The boundary trajectory is typically more easily identified from the track or rail along which the gripping members travel. For example, the effective edge of the center of the gripping member, e.g. a tenter clip, can be aligned to trace the same path as a surface of the track or rail. This surface then coincides with the boundary trajectory. In practice, the effective edge of the gripping members can be somewhat obscured by slight film slippage from or flow out from under the gripping members, but these deviations can be made small.

In addition, for gripping members such as tenter clips the length of the edge face can influence the actual boundary trajectory. Smaller clips will in general provide better approximations to the boundary trajectories and smaller stretching fluctuations. In at least some embodiments, the length of a clip face edge is no more that one-half, and can be no more than one-quarter, the total initial distance between the opposing boundary trajectories or tracks.

The two opposing tracks are optionally disposed on two separate or separable platforms or are otherwise configured to allow the distance between the opposing tracks to be adjustable. This can be particularly useful if different sizes of film are to be stretched by the apparatus or if there is a desire to vary the stretching configuration in the primary stretching region, as discussed below. Separation or variation between the opposing tracks can be performed manually, mechanically (for example, using a computer or other device to control a driver that can alter the separation distance between the tracks), or both.

Since the film is held by two sets of opposing gripping members mounted on opposing tracks, there are two opposing boundary trajectories. In at least some embodiments, these trajectories are mirror images about an MD center line of the drawing film. In other embodiments, the opposing tracks are not mirror images. Such a non-mirror image arrangement can be useful in providing a variation (for example, a gradient or rotation of principal axes) in one or more optical or physical properties across the film.

Returning to FIG. 5, the apparatus optionally includes a preconditioning region 32 that typically is enclosed by an oven 54 or other apparatus or arrangement to heat the film in preparation for stretching. The preconditioning region can include a preheating zone 42, a heat soak zone 44, or both. In at least some embodiments, there may be a small amount of film stretching that occurs in order to set the contact between the gripping members and the film, as illustrated by the boundary trajectory of FIG. 8. In at least some instances, there may not actually be any stretching but the increase in separation between the opposing tracks may account, at least in part, for thermal expansion of the film as the film is heated.

Figure 8:
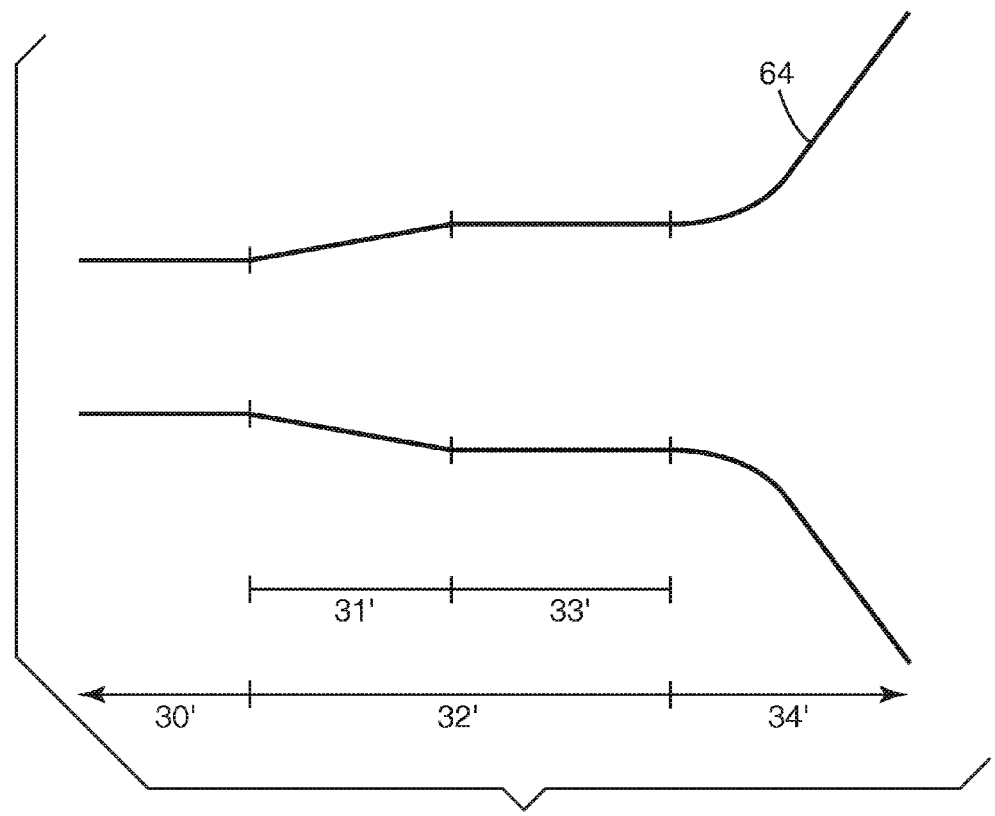
FIG. 8 is a schematic illustration of a portion of the tracks of a stretching apparatus illustrating one embodiment of a pre-conditioning region of the stretching apparatus according to the invention.

FIG. 8 illustrates a supply region 30' followed by preconditioning region 32' and primary stretching region 34'. Within the preconditioning region 32' (or optionally in the supply region 30') a gripping member set zone 31' is provided in which the tracks diverge slightly to set the gripping members (for example, tenter clips) on the film. The film is optionally heated within this zone. This initial TD stretch is typically no more than 5% of the final TD stretch and generally less than 2% of the final TD stretch and often less than 1% of the final TD stretch. In some embodiments, the zone in which this initial stretch occurs is followed by a zone 33' in which the tracks are substantially parallel and the film is heated or maintained at an elevated temperature.

Returning to FIG. 5, the film is stretched in the primary stretching region 34. Typically, within the primary stretching region 34 the film is heated or maintained in a heated environment above the glass transition of the polymer(s) of the film. For polyesters, the temperature range is typically between 80° C. and 160° C. Examples of suitable heating elements include convective and radiative heating elements, although other heating elements can also be used. In some embodiments, the heating elements used to heat the film can be controlled individually or in groups to provide a variable amount of heat. Such control can be maintained by a variety of processes including variability in the temperature of the heating elements or in the direction or speed of air directed from the heating element to the film. The control of the heating elements can be used, if desired, to variably heat regions of the film to improve or otherwise alter uniformity of stretching across the film. For example, areas of the film that do not stretch as much as other areas under uniform heating can be heated more to allow easier stretching.

Within the primary stretching region 34, the gripping members follow generally diverging tracks to stretch the polymer film by a desired amount. The tracks in the primary stretching region and in other regions of the apparatus can be formed using a variety of structures and materials. Outside of the primary stretching region, the tracks are typically substantially linear. The opposing linear tracks can be parallel or can be arranged to be converging or diverging. Within the primary stretching region, the tracks are generally diverging and are generally curvilinear, as described below.

In all regions of the stretching apparatus, the tracks can be formed using a series of linear or curvilinear segments that are optionally coupled together. The tracks can be made using segments that allow two or more (or even all) of the individual regions to be separated (for example, for maintenance or construction). As an alternative or in particular regions or groups of regions, the tracks can be formed as a single continuous construction. The tracks can include a continuous construction spanning one or more adjacent regions of the stretcher. The tracks can be any combination of continuous constructions and individual segments.

In at least some embodiments, the tracks in the primary stretching region are coupled to, but separable from, the tracks of the preceding regions. The tracks 140, 141 in the succeeding post-conditioning or removal regions are typically separated from the tracks of the primary stretching region, as illustrated, for example, in FIG. 5.

Although the tracks in the primary stretching region are curvilinear, linear track segments can be used in at least some embodiments. These segments are aligned (by, for example, pivoting individual linear segments about an axis) with respect to each other to produce a linear approximation to a desired curvilinear track configuration. Generally, the shorter the linear segments are, the better the curvilinear approximation can be made. In some embodiments, the positions of one or more, and preferably all, of the linear segments are adjustable (pivotable about an axis) so that the shape of the tracks can be adjusted if desired. Adjustment can be manual or the adjustment can be performed mechanically, preferably under control of a computer or other device coupled to a driver. It will be understood, that curvilinear segments can be used instead of or in addition to linear segments.

Continuous tracks can also be used through each of the regions. In particular, a continuous, curvilinear track can be used through the primary stretching region. The continuous, curvilinear track typically includes at least one continuous rail that defines the track along which the gripping members run. In one embodiment, the curvilinear track includes two pairs of inner and outer rails with tenter clips mounted on top and bottom bearings rolling between the four rails.

Figure 9:
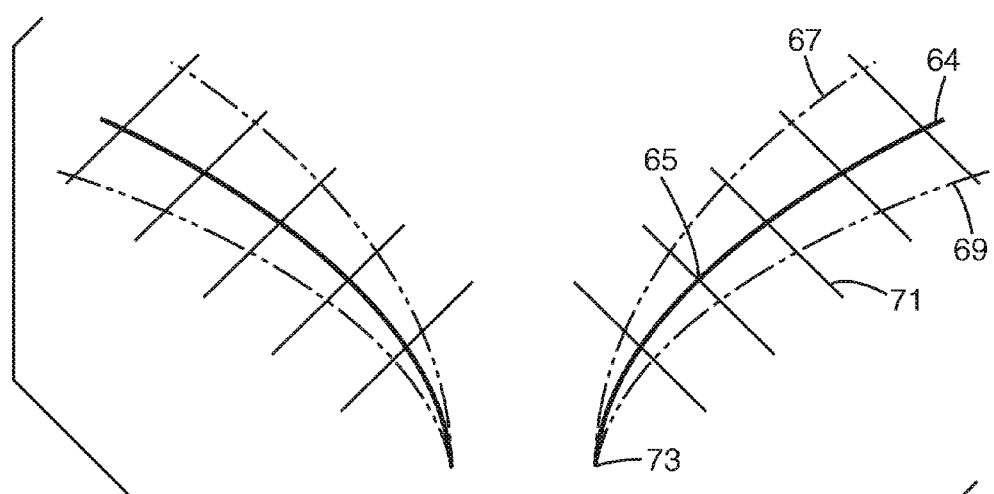
FIG. 9 is a schematic illustration of one embodiment of adjustable tracks for a primary stretching region of a stretching apparatus according to the invention.

In some embodiments, the continuous track is adjustable. One method of making an adjustable continuous track includes the use of one or more track shape control units. These track shape control units are coupled to a portion of the continuous track, such as the continuous rail, and are configured to apply a force to the track as required to bend the track. FIG. 9 schematically illustrates one embodiment of such an arrangement with the track shape control units 65 coupled to the track 64. Generally, the track shape control units have a range of forces that the track shape control unit can apply, although some embodiments may be limited to control units that are either on or off. The track shape control units can typically apply a force toward the center of the film or apply a force away from the center of the film or, preferably, both. The track shape control units can be coupled to a particular point on the adjustable continuous track or the track shape control units can be configured so that the track can slide laterally along the control unit while still maintaining coupling between the track and control unit. This arrangement can facilitate a larger range of motion because it allows the track to more freely adjust as the control units are activated. Generally, the track shape control units allow the track to move through a range of shapes, for example, shapes 67 and 69 of FIG. 9. Typically, the track shape control unit and the track can move along a line 71 (or other geometric shape) of motion. When more than one track shape control unit is used, the track shape control units can have the same or similar lines of motion and ranges of motion or the lines and ranges of motions for the individual track shape control units can be different.

Figure 16:
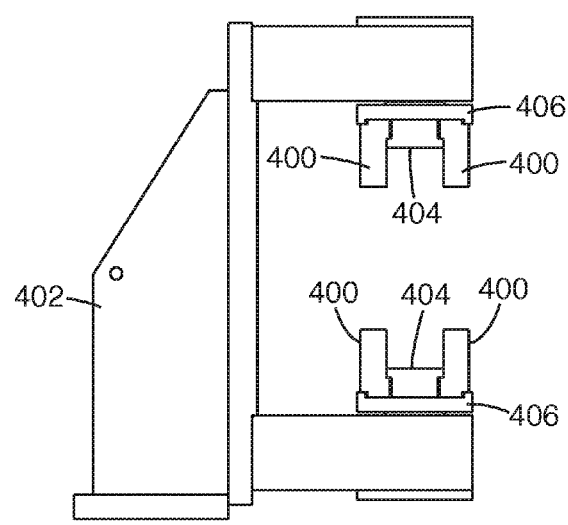
FIG. 16 is a schematic side cross-sectional view of one embodiment of tracks and a track shape control unit for a stretching apparatus according to the invention.
Figure 21:
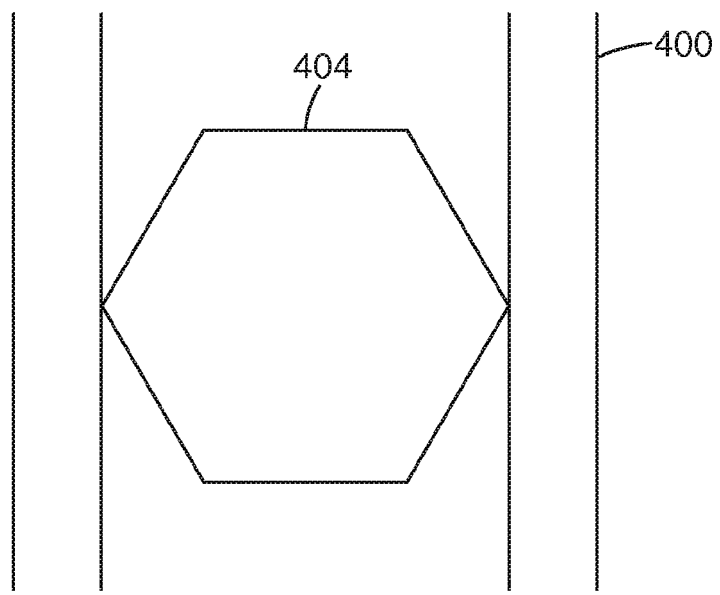
FIG. 21 is a schematic view of a portion of the track and track shape control unit of one embodiment of FIG. 16.
Figure 22:
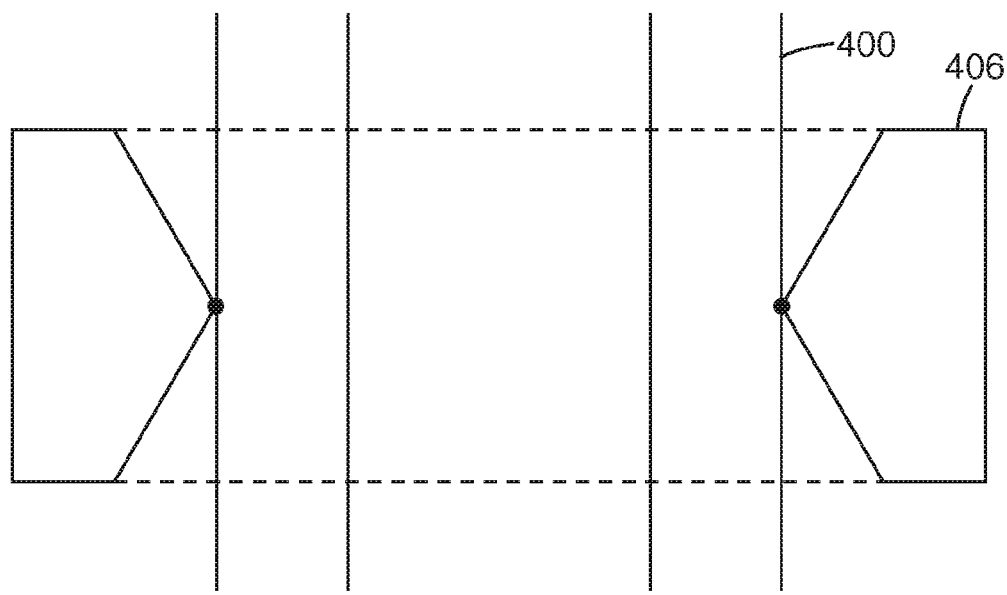
FIG. 22 is a schematic view of another portion of the track and track shape control unit of one embodiment of FIG. 16.

One example of a suitable track shape control unit and track is illustrated in FIG. 16. The track in this embodiment includes four rails 400 with tenter clips (not shown) mounted on bearings (not shown) rolling between the four rails. The track shape control unit includes a base 402 that is coupled to a driver (not shown), top and bottom inner contact members 404, and top and bottom outer contact members 406. The inner and outer contact members 404, 406 are coupled to the base 402 so that moving the base allows the contact members to apply a force to inner and outer surfaces of the rails, respectively. Preferably, the inner and outer contact members have a shape, when viewed from above or below, that provides only small areas of contact between the inner contact members 406 an the rails 400, as illustrated in FIG. 21 (which only shows the rails 400 and inner contact member 406). Examples of such shapes include circular and ovoid, as well as diamond, hexagonal, or other similar shapes where contact between the inner contact members 406 and the rails is made at the apex of these shapes. The outer contact members 404 can be similarly fashioned so that the portion of the outer contact member, when viewed from above or below, comes to a point to make contact with the rails 400, as illustrated in FIG. 22 (which only shows the rails 400 and the portion of the outer contact member 404 that makes contact with the rails). Using such shapes allows the track shape control unit to exert a force, if desired, to modify the track shape while allowing the track to slide laterally through the control unit rather than being fixed to the control unit. This configuration can also allow the track to adjust its instantaneous slope within the control unit. For one or both of these reasons, the track can have a larger range of shape adjustment. In other embodiments, there can be fewer or more contact members or there may be only inner or only outer contact members.

Returning to FIG. 9, in some embodiments, one or more points 73 of the track are fixed. The fixed points can be anywhere along the track including at or near the start (as illustrated in FIG. 9) or end of the primary stretching region. The fixed points 73 can also be positioned at other points along the track as illustrated in FIG. 15.

Figure 15:
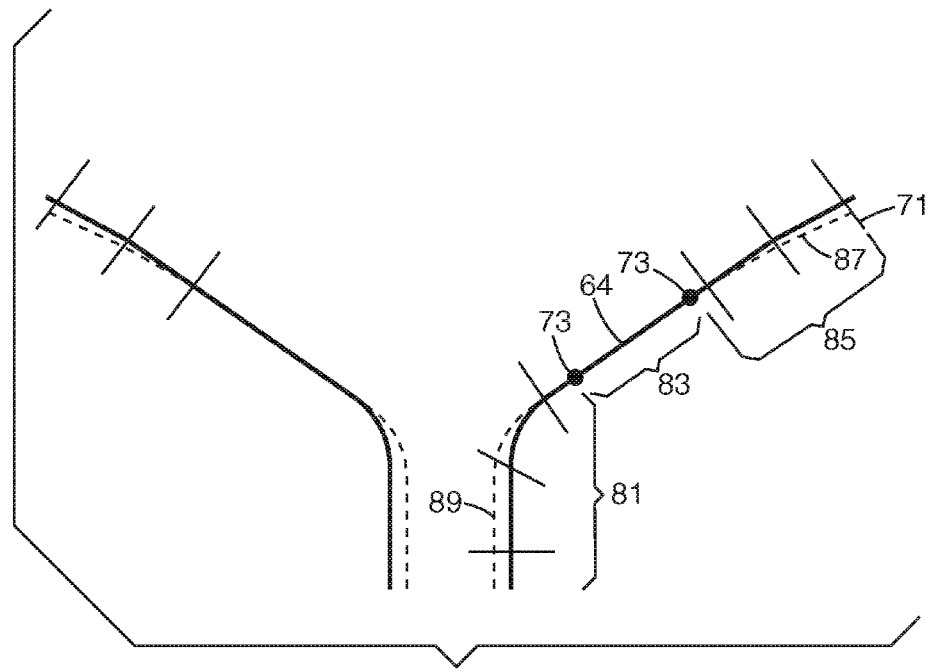
FIG. 15 is a schematic illustration of another embodiment of tracks for a primary stretching region of a stretching apparatus according to the invention.

As further illustrated in FIG. 15, the tracks can be configured to provide zones 81, 83, 85 within the primary stretching region that have different stretching characteristics or that can be described by different mathematical equations. In some embodiments, the tracks have a shape that defines these different zones. In other embodiments, the tracks can be adjusted, using for example the track shape control units discussed above, to provide a variety of shapes 87, 89 beyond simple, monofunctional arrangements. This can be advantageous because it allows different portions of the primary stretching region to accomplish desired functions. For example, an initial stretching zone may have a particular shape (for example, a super-uniaxial shape with U>1 and F>1 as described below) followed by one or more later zones with different shapes (for example, a uniaxial shape). Optionally, intermediate zones can be provided that transition from one shape to another. In some embodiments, the individual zones can be separated or defined by points 73 of the track that are fixed.

In some embodiments, the track has a non-uniform cross-sectional shape along the length of the track to facilitate bending and shaping of the track. For example, one or more rails used in the track can have different cross-sectional shapes. As an example, in the four rail construction described above each of the rails, or a subset of the rails, has a varied cross-section along the length of the track. The cross-section can be varied by, for example, altering either the height or thickness of the track (or a component of the track such as one or more continuous rails) or both. As an example, in one embodiment the thickness of the track or one or more rails in the track decreases or increases along the length of the track in the machine direction. These variations can be used to support a particular track shape or a variation in track shape adjustability. For example, as described above the track may have several different zones, each zone having a different track shape. The cross-sectional variation of the track or component of the track can vary within each zone to achieve or facilitate a particular rail shape and can vary between zones. As an example, a zone with a relatively thick cross-sectional shape can be disposed between two other zones to isolate or provide a transitional space between the two zones.

As an example of variation in track or rail cross-section, the arclength, s, can be used to represent a position along the track in the design of the thickness profile of a track or portion of a track, such as a rail. The arclength, s, at the start of draw is defined as zero and at the other end of the draw is defined as L with corresponding thicknesses at the beginning and end of draw being designated as h(0) and h(L), respectively. The track or track component (e.g., rail) in this particular embodiment has a taper over a portion of the beam from L' to L" between s=0 and s=L such that the thickness h(L') at position L' is greater than the thickness h(L") at position L". In this manner, either L' or L" may be at the higher arclength coordinate (i.e., L'>L" or L'<L"). One example of a useful thickness profile is a taper given by the function for thickness, h(s), as a function of arclength s over the rail from L' to L" is provided by the equation:

$$h(s)=(h(L')-h(L''))(1-(s-L')/(L''-L'))^{\alpha}+h(L'')$$

where $\alpha$ is the positive rate of taper resulting in decreasing thickness from L' to L". When L' is less than L" this results in a decreasing thickness with arclength. When L' is greater than L" this results in a increasing thickness with arclength. The track can optionally be apportioned into sections, each with its own local L', L" and rate of taper. The maximum thickness of the track or track component depends on the amount of flexibility desired at that point on the track. Using beam theory, it can be shown that in the case of a straight beam with a taper, a value for $\alpha$ of one third provides a beam that bends parabolically in response to a load at one end. When the beam begins in a curved equilibrium configuration or is loaded by several control points, other tapers may be more desirable. For transformation across a variety of other shapes, it may be useful to have both increasing and decreasing thickness within a given track or track component, or numerically calculated forms of the taper over any of these sections. The minimum thickness at any point along the track or track component depends on the amount of required strength of the track to support the drawing forces. The maximum thickness can be a function of the level of needed flexibility. It is typically beneficial to maintain the level of track adjustment within the elastic range of the track or track component, e.g. to avoid the permanent yielding of the track or track component and loss of repeatable adjustment capability.

The paths defined by the opposing tracks affect the stretching of the film in the MD, TD, and ND directions. The stretching (or drawing) transformation can be described as a set of draw ratios: the machine direction draw ratio (MDDR), the transverse direction draw ratio (TDDR), and the normal direction draw ratio (NDDR). When determined with respect to the film, the particular draw ratio is generally defined as the ratio of the current size (for example, length, width, or thickness) of the film in a desired direction (for example, TD, MD, or ND) and the initial size (for example, length, width, or thickness) of the film in that same direction. Although these draw ratios can be determined by observation of the polymer film as drawn, unless otherwise indicated reference to MDDR, TDDR, and NDDR refers to the draw ratio determined by a track used to stretch the polymer film.

At any given point in the stretching process, TDDR corresponds to a ratio of the current separation distance of the boundary trajectories, L, and the initial separation distance of the boundary trajectories, $L_0$, at the start of the stretch. In other words, TDDR=L/$L_0$. In some instances (as in FIGS. 2 and 4), TDDR is represented by the symbol $\lambda$. At any given point in the stretching process, MDDR is the cosine of the divergence angle, $\theta$, the positive included angle between MD and the instantaneous tangent of the boundary trajectory, e.g. track or rail. It follows that cot ($\theta$) is equal to the instantaneous slope (i.e., first derivative) of the track at that point. Upon determination of TDDR and MDDR, NDDR=1/(TDDR*MDDR) provided that the density of the polymer film is constant during the stretching process. If, however, the density of the film changes by a factor of $\rho'_f$, where $\rho'_f=\rho/\rho_0$ with $\rho$ being the density at the present point in the stretching process and $\rho_0$ being the initial density at the start of the stretch, then NDDR=$\rho'_f$/(TDDR*MDDR) as expected. A change in density of the material can occur for a variety of reasons including, for example, due to a phase change, such as crystallization or partial crystallization, caused by stretching or other processing conditions.

Figure 2:
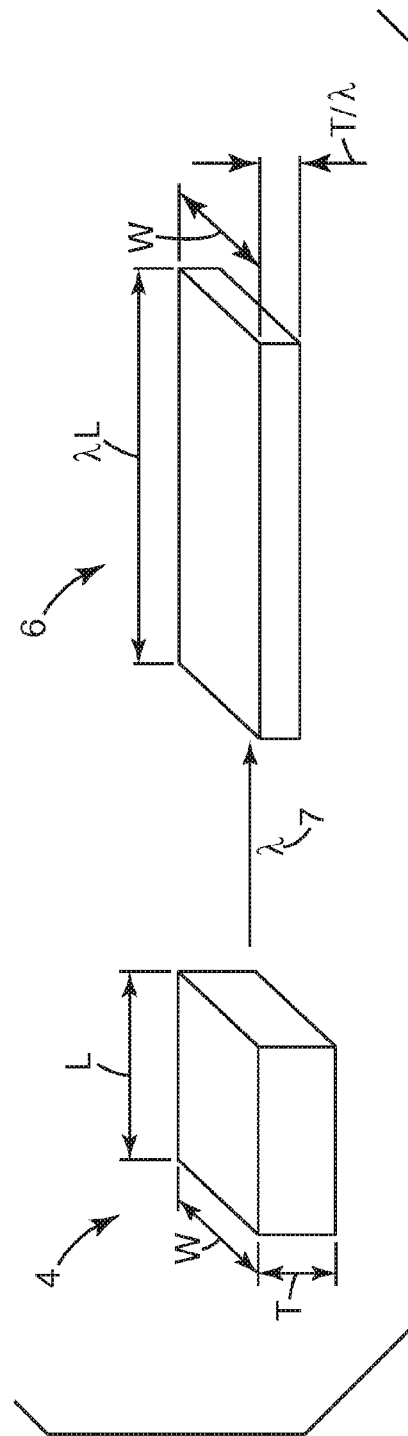
FIG. 2 is a perspective view of a portion of film in the prior art process depicted in FIG. 1 both before and after the stretching process.

Perfect uniaxial drawing conditions, with an increase in dimension in the transverse direction, result in TDDR, MDDR, and NDDR of $\lambda$, $(\lambda)^{-1/2}$, and $(\lambda)^{-1/2}$, respectively, as illustrated in FIG. 2 (assuming constant density of the material). In other words, assuming uniform density during the draw, a uniaxially oriented film is one in which MDDR=$(TDDR)^{-1/2}$ throughout the draw. A useful measure of the extent of uniaxial character, U, can be defined as:

$$U = \frac{\frac{1}{MDDR} - 1}{TDDR^{1/2} - 1}$$

For a perfect uniaxial draw, U is one throughout the draw. When U is less than one, the drawing condition is considered "subuniaxial". When U is greater than one, the drawing condition is considered "super-uniaxial". In a conventional tenter, where the polymer film is stretched linearly along tracks 2, as illustrated in FIGS. 1 and 2, to stretch a region 4 of the film to a stretched region 6 and the divergence angle is relatively small (e.g., about 3° or less), MDDR is approximately 1 and U is approximately zero. If the film is biaxially drawn so that MDDR is greater than unity, U becomes negative. In some embodiments, U can have a value greater than one. States of U greater than unity represent various levels of over-relaxing. These over-relaxed states produce an MD compression from the boundary edge. If the level of MD compression is sufficient for the geometry and material stiffness, the film will buckle or wrinkle.

As expected, U can be corrected for changes in density to give $U_f$ according to the following formula:

$$U_f = \frac{\frac{1}{MDDR} - 1}{\left(\frac{TDDR}{\rho_f}\right)^{1/2} - 1}$$

Preferably, the film is drawn in plane (i.e., the boundary trajectories and tracks are coplanar) such as shown in FIG. 5, although non-coplanar stretching trajectories are also acceptable. The design of in-plane boundary trajectories is simplified because the in-plane constraint reduces the number of variables. The result for a perfect uniaxial orientation is a pair of mirror symmetric, in-plane, parabolic trajectories diverging away from the in-plane MD centerline. The parabola may be portrayed by first defining TD as the "x" direction and MD as the "y" direction. The MD centerline between the opposing bounding parabolas may be taken as the y coordinate axis. The coordinate origin may be chosen to be the beginning of the primary stretching region and corresponds to the initial centerpoint of the central trace between the parabolic trajectories. The left and right bounding parabolas are chosen to start (y=0) at minus and plus $x_0$, respectively. The right bounding parabolic trajectory, for positive y values, that embodies this embodiment of the invention is:

$$x/x_0=(1/4)(y/x_0)^2+1$$

The left bounding parabolic trajectory is obtained by multiplying the left-hand side of the above equation by minus unity. In the discussion below, descriptions of and methods for determining the right bounded trajectory are presented. A left bounded trajectory can then be obtained by taking a mirror image of the right bounded trajectory over the centerline of the film.

The coplanar parabolic trajectory can provide uniaxial orientation under ideal conditions. However, other factors can affect the ability to achieve uniaxial orientation including, for example, non-uniform thickness of the polymer film, non-uniform heating of the polymer film during stretching, and the application of additional tension (for example, machine direction tension) from, for example, down-web regions of the apparatus. In addition, in many instances it is not necessary to achieve perfect uniaxial orientation. Instead, a minimum or threshold U value or an average U value that is maintained throughout the draw or during a particular portion of the draw can be defined. For example, an acceptable minimum/threshold or average U value can be 0.7, 0.75, 0.8, 0.85, 0.9, or 0.95, as desired, or as needed for a particular application.

As an example of acceptable nearly uniaxial applications, the off-angle characteristics of reflective polarizers used in liquid crystalline display applications is strongly impacted by the difference in the MD and ND indices of refraction when TD is the principal mono-axial draw direction. An index difference in MD and ND of 0.08 is acceptable in some applications. A difference of 0.04 is acceptable in others. In more stringent applications, a difference of 0.02 or less is preferred. For example, the extent of uniaxial character of 0.85 is sufficient in many cases to provide an index of refraction difference between the MD and ND directions in polyester systems containing polyethylene naphthalate (PEN) or copolymers of PEN of 0.02 or less at 633 nm for mono-axially transverse drawn films. For some polyester systems, such as polyethylene terephthalate (PET), a lower U value of 0.80 or even 0.75 may be acceptable because of lower intrinsic differences in refractive indices in non-substantially uniaxially drawn films.

For sub-uniaxial draws, the final extent of truly uniaxial character can be used to estimate the level of refractive index matching between the y (MD) and z (ND) directions by the equation $$\Delta n_{yz}=\Delta n_{yz}(U=0)\times(1-U)$$

where $\Delta n_{yz}$ is the difference between the refractive index in the MD direction (i.e., y-direction) and the ND direction (i.e., z-direction) for a value U and $\Delta n_{yz}(U=0)$ is that refractive index difference in a film drawn identically except that MDDR is held at unity throughout the draw. This relationship has been found to be reasonably predictive for polyester systems (including PEN, PET, and copolymers of PEN or PET) used in a variety of optical films. In these polyester systems, $\Delta n_{yz}(U=0)$ is typically about one-half or more the difference $\Delta n_{xy}(U=0)$ which is the refractive difference between the two in-plane directions MD (y-axis) and TD (x-axis). Typical values for $\Delta n_{xy}(U=0)$ range up to about 0.26 at 633 nm. Typical values for $\Delta n_{yz}(U=0)$ range up to 0.15 at 633 nm. For example, a 90/10 coPEN, i.e. a copolyester comprising about 90% PEN-like repeat units and 10% PET-like repeat units, has a typical value at high extension of about 0.14 at 633 nm. Films comprising this 90/10 coPEN with values of U of 0.75, 0.88 and 0.97 as measured by actual film draw ratios with corresponding values of $\Delta n_{yz}$ of 0.02, 0.01 and 0.003 at 633 nm have been made according to the methods of the present invention.

One set of acceptable parabolic trajectories that are nearly or substantially uniaxial character can be determined by the following method. This described method determines the "right" boundary trajectory directly, and the "left" boundary trajectory is taken as a mirror image. First, a condition is set by defining an instantaneous functional relationship between TDDR measured between the opposing boundary trajectories and MDDR defined as the cosine of the non-negative divergence angle of those boundary trajectories, over a chosen range of TDDR. Next, the geometry of the problem is defined as described in the discussion of the parabolic trajectories. $x_1$ is defined as the initial half distance between the boundary trajectories and a ratio $(x/x_1)$ is identified as the instantaneous TDDR, where x is the current x position of a point on the boundary trajectory. Next, the instantaneous functional relationship between the TDDR and MDDR is converted to a relationship between TDDR and the divergence angle. When a specific value of U is chosen, the equations above provide a specific relationship between MDDR and TDDR which can then be used in the algorithm to specify the broader class of boundary trajectories that also includes the parabolic trajectories as a limiting case when U approaches unity. Next, the boundary trajectory is constrained to satisfy the following differential equation:

$$d(x/x_1)/d(y/x_1)=\tan(\theta)$$

where tan (θ) is the tangent of the divergence angle θ, and y is the y coordinate of the current position of the opposing point on the right boundary trajectory corresponding to the given x coordinate. Next, the differential equation may be solved, e.g. by integrating 1/tan(θ) along the history of TDDR from unity to the maximum desired value to obtain the complete coordinate set {(x,y)} of the right boundary trajectory, either analytically or numerically.

As another example of acceptable trajectories, a class of in-plane trajectories can be described in which the parabolic trajectory is used with smaller or larger initial effective web TD length. If $x_1$ is half of the separation distance between the two opposing boundary trajectories at the inlet to the primary stretching region (i.e. the initial film TD dimension minus the selvages held by the grippers which is the initial half distance between opposing boundary trajectories), then this class of trajectories is described by the following equation:

$$\pm(x)/(x_1)=(1/4)(x_1/x_0)(y/x_1)^2+1$$

where $x_1/x_0$ is defined as a scaled inlet separation. The quantity $x_0$ corresponds to half of the separation distance between two opposing tracks required if the equation above described a parabolic tracks that provided a perfectly uniaxial draw. The scaled inlet separation, $x_1/x_0$, is an indication of the deviation of the trajectory from the uniaxial condition. In one embodiment, the distance between the two opposing tracks in the primary stretching zone is adjustable, as described above, allowing for the manipulation of the trajectory to provide values of U and F different than unity.

Other methods of forming these trajectories can also be used including, for example, manipulating the shape of the trajectories using track shape control units or by selecting a fixed shape that has the desired trajectory.

For super-uniaxial draws, the severity of the wrinkling can be quantified using the concept of overfeed. The overfeed, F, can be defined as the uniaxial MDDR (which equals $(TDDR)^{-1/2}$) divided by the actual MDDR. If the actual MDDR is less than the uniaxial MDDR, the overfeed F is less than unity and the MDDR is under-relaxed resulting in a U less than unity. If F is greater than unity, the draw is super-uniaxial and the MDDR is over-relaxed relative to the uniaxial case. At least a portion of the extra slack can be accommodated as a wrinkle because the compressive buckling threshold is typically low for thin, compliant films. When F is greater than unity, the overfeed corresponds at least approximately to the ratio of the actual film contour length in the wrinkles along MD to the in-plane contour length or space.

Because of the relationship between TDDR and MDDR in the case of constant density, F can be written as:

$$F=1/(MDDR \times TDDR^{1/2})$$

Typically, F is taken as density independent for design purposes. Large values of F anytime during the process can cause large wrinkles that can fold over and stick to other parts of the film causing defects. In at least some embodiments, the overfeed, F, remains at 2 or less during the draw to avoid or reduce severe wrinkling or fold over. In some embodiments, the overfeed is 1.5 or less throughout the course of the draw. For some films, a maximum value of F of 1.2 or even 1.1 is allowed throughout the draw.

For at least some embodiments, particularly embodiments with U>1 through the entire draw, rearranging the definition of overfeed provides a relative bound on a minimum MDDR given a current TDDR:

$$MDDR > 1/(F_{max} \times TDDR^{1/2})$$

where $F_{max}$ can be chosen at any preferred level greater than unity. For example, F can be selected to be 2, 1.5, 1.2, or 1.1, as described above.

When the over-feed is less than unity, there is effectively more in-plane space along MD than is desired for the truly uniaxial draw and the MDDR may be under-relaxed and causing MD tension. The result can be a U value less than unity. Using the relationships between U, F, MDDR and TDDR there is a corresponding correlation between U and F which varies with TDDR. At a critical draw ratio of 2, a minimum U value corresponds to a minimum overfeed of about 0.9. For at least some boundary trajectories including boundary trajectories in which U>1 for the entire draw, MDDR can be selected to remain below a certain level during a final portion of draw, e.g.

$$MDDR < 1/(F_{min} \times TDDR^{1/2})$$

where $F_{min}$ is 0.9 or more for a final portion of draw after a draw ratio of 2.

As an example, trajectories can be used in which MDDR<$(TDDR)^{-1/2}$ (i.e., U>1) throughout the stretch, $F_{max}$ is 2, and the film is stretched to a TDDR of at 4. If the trajectories are coplanar, then the film is stretched to a TDDR of at least 2.4 and often at least 5.3. If $F_{max}$ is 1.5, then the film is stretched to a TDDR of at least 6.8. If the trajectories are coplanar, then the film is stretched to a TDDR of at least 2.1 and often at least 4.7, If $F_{max}$ is 1.2, then the film is stretched using coplanar trajectories to a TDDR of at least 1.8 and often at least 4.0. For coplanar or non-coplanar boundary trajectories, if no limit is placed on F, then the film is stretched to a TDDR of greater than 4 and often of at least 6.8.

In another example, coplanar trajectories can be used in which $(F_{min})*(MDDR) < (TDDR)^{-1/2}$ throughout the stretch, $F_{max}$ is 2, $F_{min}$ is 0.9, and the film is stretched to a TDDR of at least 4.6 and often at least 6.8. If $F_{max}$ is 1.5, then the film is stretched to a TDDR of at least 4.2 and often at least 6. 1, If $F_{max}$ is 1.2, then the film is stretched to a TDDR of at least 3.7 and often at least 5.4. If no limit is placed on F, then the film is stretched to a TDDR of at least 8.4. A boundary trajectory can also be used in which $(F^{min})*(MDDR) < (TDDR)^{-1/2}$ throughout the stretch, $F_{max}$ is 1.5, $F_{min}$ is 0.9, and the film is stretched to a TDDR of at least 6.8.

Other useful trajectories can be defined using $F_{max}$. Useful trajectories include coplanar trajectories where TDDR is at least 5, U is at least 0.85 over a final portion of the stretch after achieving a TDDR of 2.5, and $F_{max}$ is 2 during stretching. Useful trajectories also include coplanar trajectories where TDDR is at least 6, U is at least 0.7 over a final portion of the stretch after achieving a TDDR of 2.5, and $F_{max}$ is 2 during stretching.

Yet other useful coplanar trajectories include those in which MDDR<$TDDR^{-1/2}$<$(F_{max})*(MDDR)$ during a final portion of the draw in which TDDR is greater than a critical value TDDR'. The following provides minimum draw ratios that should be achieved for the trajectory. When TDDR' is 2 or less, then for $F_{max}$=2, the minimum draw is 3.5; for $F_{max}$=1.5, the minimum draw is 3.2; and for $F_{max}$=2, the minimum draw is 2.7. When TDDR' is 4 or less, then for $F_{max}$=2, the minimum draw is 5.8; for $F_{max}$=1.5, the minimum draw is 5.3; and for $F_{max}$=1.2, the minimum draw is 4.8. When TDDR' is 5 or less, then for $F_{max}$=2, the minimum draw is 7; for $F_{max}$=1.5, the minimum draw is 6.4; and for $F_{max}$=1.2, the minimum draw is 5.8.

In general, a variety of acceptable trajectories can be constructed using curvilinear and linear tracks so that the overfeed remains below a critical maximum level throughout the drawing to prevent fold-over defects while remaining above a critical minimum level to allow the desired level of truly uniaxial character with its resulting properties.

Figure 18:
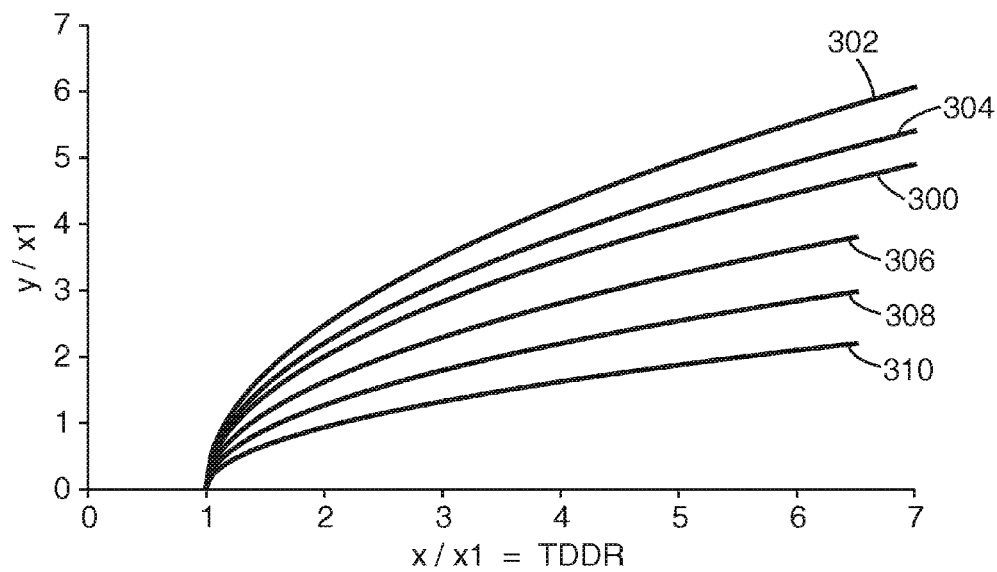
FIG. 18 is a graph of examples of suitable boundary trajectories for a primary stretching region of a stretching apparatus according to the invention.

A variety of sub-uniaxial and super-uniaxial trajectories may be formed using the parabolic shape. FIG. 18 illustrates examples that demonstrate a different levels minimum U after a critical TDDR and that demonstrate a different maximum overfeeds up to a final desired TDDR. The curves are represented by coordinates x and y as scaled by $x_1$, half the initial separation distance of the tracks. The scaled x coordinate, the quantity $(x/x_1)$, is therefore equal to the TDDR. Curve 300 is the ideal case with a value of $x_1/x_0$ of 1.0. Curve 302 is the parabolic case with a value of $x_1/x_0$ of 0.653 in which U remains greater than 0.70 above a draw ratio of 2.5. Curve 304 is the parabolic case with a value of $x_1/x_0$ of 0.822 in which U remains above 0.85 after a draw ratio of 2.5. Curves 306, 308, and 310 illustrate various levels of overfeed. The overfeed, TDDR and scaled inlet width are related by $$x_1/x_0 = (F^2(TDDR)-1)/(TDDR-1)$$

It follows directly that the overfeed increases with increasing TDDR in the parabolic trajectories described here. Curve 306 is the parabolic case with a value of $x_1/x_0$ of 1.52 in which the overfeed remains below 1.2 up to a final draw ratio of 6.5. Curve 308 is the parabolic case with a value of $x_1/x_0$ of 2.477 in which the overfeed remains below 1.5 up to a final draw ratio of 6.5. Curve 310 is the parabolic case with a value of $x_1/x_0$ of 4.545 in which the overfeed remains below 2 up to a final draw ratio of 6.5. The level of overfeed is a function of the final draw ratio in these cases. For example, using a value of $x_1/x_0$ of only 4.333 rather than 4.545 allows drawing to a final TDDR of 10 while keeping the overfeed under 2.

For the parabolic trajectories, a relationship allows the direct calculation of MDDR at any given TDDR for a fixed scaled inlet width:

$$MDDR=(TDDR(x_1/x_0)+(1-x_1/x_0))^{-1/2}$$

Figure 19:
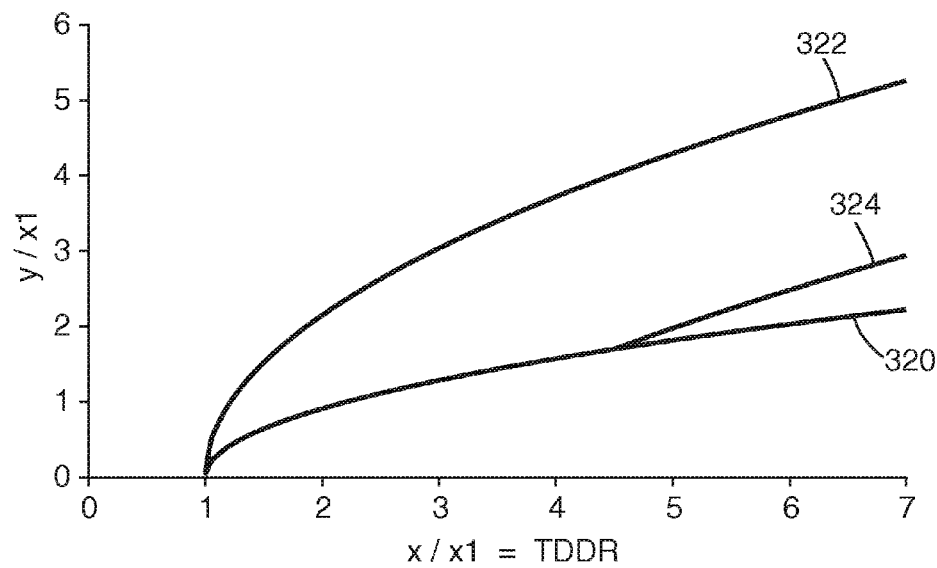
FIG. 19 is a graph of examples of suitable boundary trajectories for a primary stretching region of a stretching apparatus according to the invention illustrating the use of different stretching regions with different parabolic configurations.

One observation is that the relationship between MDDR and TDDR is not an explicit function of the y position. This allows the construction of composite hybrid curves comprising sections of parabolic trajectories that are vertically shifted in $y/x_1$. FIG. 19 illustrates one method. A parabolic trajectory for the initial portion of the draw is chosen, curve 320 and a parabolic trajectory is chosen for the final portion, curve 322. The initial curve 320 is chosen to provide a super-uniaxial draw with a maximum overfeed of 2.0 at a draw ratio of 4.5. Curve 320 has a scaled inlet width of 4.857. The final curve 322 is chosen to be a sub-uniaxial draw with a minimum U of 0.9 at the 4.5 draw ratio. Curve 322 has a scaled inlet width of 0.868. The actual track or rail shape follows curve 320 up to TDDR of 4.5 and then continues on curve 324 which is a vertically shifted version of curve 322. In other words, a trajectory can have an initial stretching zone with tracks having a functional form correspond to:

$$\pm(x)/(x_1)=(\tfrac{1}{4})(x_1/x_0)(y/x_1)^2+1$$

and then a later stretching zone with tracks having a functional form corresponding to $$\pm(x)/(x_2)=(\tfrac{1}{4})(x_2/x_0)((y-A)/x_2)^2+1;$$

where $x_1$ and $x_2$ are different and A corresponds to the vertical shift that permits coupling of the trajectories. Any number of parabolic segments may be combined in this manner.

Figure 20:
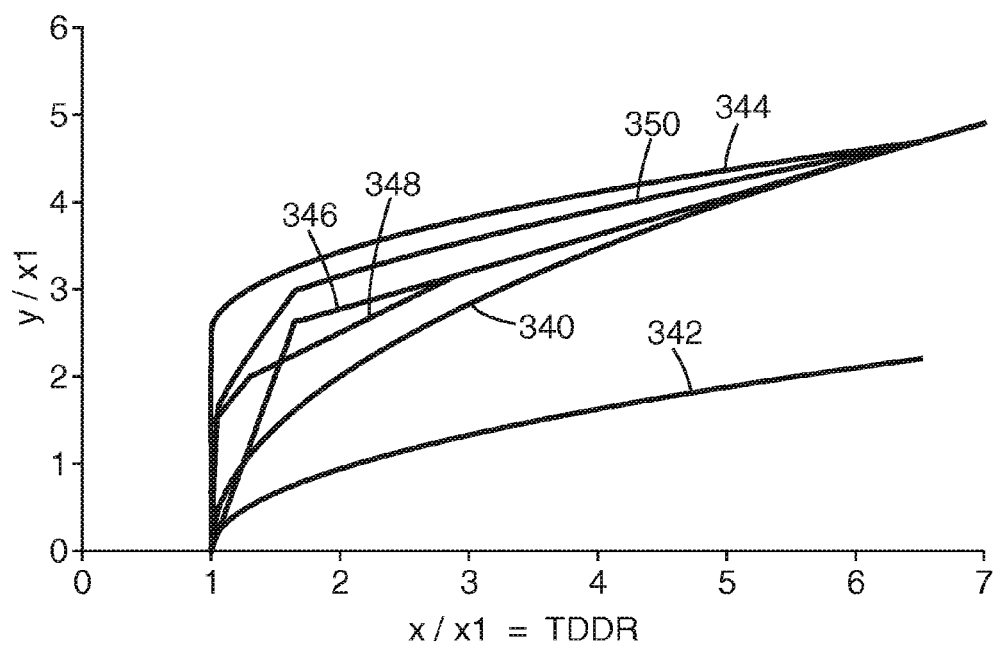
FIG. 20 is a graph of examples of suitable boundary trajectories for a primary stretching region of a stretching apparatus according to the invention including boundary trajectories that are linear approximations to suitable parabolic or substantially parabolic boundary trajectories.

The parabolic trajectories, and their composite hybrids, can be used to guide the construction of related trajectories. One embodiment involves the use of linear segments to create trajectories. These linear approximations can be constructed within the confines of parabolic trajectories (or composite hybrids) of maximum overfeed and minimum overfeed (or minimum U) at a chosen TDDR' larger than a critical draw ratio, TDDR*. Values for TDDR* can be selected which relate to the onset of strain-induced crystallinity with examples of values of 1.5, 2, and 2.5 or may be related to elastic strain yielding with lower values of 1.2 or even 1.1. The range of TDDR* generally falls between 1.05 and 3. Portions of the rail or track below TDDR* may not have any particular constraints on minimum overfeed or U and may fall outside the confines of the constraining parabolic trajectories. In FIG. 20, curve 340 is chosen to be the constraining parabolic trajectory of minimum overfeed at the chosen draw ratio, TDDR', illustrated here at a value of 6.5. For illustration, the minimum overfeed constraining parabolic trajectory has been chosen as the ideal curve with a scaled inlet width of unity. Using the relationship between overfeed, TDDR and scaled inlet width, curve 342 is identified as the constraining parabolic trajectory of maximum overfeed where the maximum value of F is 2.0 at the TDDR value of 6.5. Curve 342 is now vertically shifted to form curve 344 so that the two constraining parabolic trajectories meet at the chosen TDDR' of 6.5. It should be remarked that curves 342 and 344 are completely equivalent with respect to drawing character. Curve 344 merely delays the stretch until a later spatial value of $y/x_1$ of 2.489. An approximation of linear or non-parabolic curvilinear segments will tend to lie between these constraining trajectories above TDDR*.

Unlike parabolic trajectories that possess increasing divergence angles with increasing TDDR, linear trajectories have a fixed divergence angle. Thus the overfeed decreases with increasing TDDR along a linear segment. A simple linear approximation can be constructed by choosing a line with a divergence angle equal to the desired minimum overfeed at the chosen TDDR. The line segment may be extrapolated backwards in TDDR until the overfeed equals the maximum allowed. A subsequent linear segment is started in similar fashion. The procedure is repeated as often as necessary or desired. As the maximum overfeed decreases, the number of segments needed for the approximation increases. When the TDDR drops below TDDR*, any number of methods may be used to complete the track or rail as long as the constraint on maximum overfeed is maintained. In FIG. 20, curve 346 is a linear approximation constrained by a maximum overfeed of 2. Because of this large maximum overfeed, it comprises only two linear sections. The final linear segment extends all the way backwards from the chosen TDDR of 6.5 to a lower TDDR of 1.65. In this case, TDDR* is taken as 2. Without a constraint on U below a TDDR of 2, one method of finishing the track is to extrapolate a second linear segment from TDDR at 1.65 back to TDDR of unity at the $y/x_1$ zero point. Note that this causes the second segment to cross the lower constraining parabola, since the constraint is not effective below TDDR*.

In FIG. 20, curve 348 is the result of using a tighter value for the maximum overfeed of 1.5. Here the constraining parabolic trajectory of maximum overfeed is not shown. Three linear segments are required. The first segment extends backwards from TDDR of 6.5 to TDDR of 2.9. The second segment assumes a divergence angle equal to the constraining parabolic trajectory of minimum overfeed at this TDDR value of 2.9 and extends backwards to a TDDR of 1.3. This second segment ends below TDDR*. The final segment completes the track or rail shape for curve 348 using a different method than that used for curve 346. Here the same procedure for the last segment is used as for the previous segments, resulting in a delay of the onset of stretching with higher $y/x_1$ value of. A third method of completing the track is to set the overfeed to the maximum at the initial TDDR of unity.

General, non-linear and non-parabolic trajectories fitting the requirements of the present invention can be constructed using the constraining parabolic trajectories. The maximum overfeed constraining parabolic trajectory is the curve of minimum slope, i.e. maximum divergence angle, as a function of TDDR. The minimum overfeed constraining parabolic trajectory is the curve of maximum slope, i.e. minimum divergence angle, as a function of TDDR. In general, curves can be extrapolated backwards from the chosen TDDR' using any function of slope that lies between the constraining bounds. A simple method for defining a function for the slope that lies between these constraints is to take a simple linear combination of known curves within the envelope. Curve 350 in FIG. 20 illustrates this simple method. In this example, 350 is formed by a linear combination of the maximum overfeed constraining parabolic trajectory, curve 344, and the linear approximation to it, curve 346, with the linear weights of 0.7 and 0.3, respectively. In general, functions that are not simple linear combinations can also be used.

The aforementioned method for describing the various non-parabolic trajectories of the present invention can be applied over different sections of the track, e.g. the example of FIG. 20 for TDDR up to 6.5 may be combined with another section for TDDR over 6.5 with different requirements and therefore different maximum and minimum constraining trajectories over that higher range of TDDR. In this case, the TDDR' of the previous section of lower draw takes on the role of TDDR*. In general, TDDR' may be chosen across the range of desired drawing. Various sections may be used to account for the various phenomenon of drawing, such as yielding, strain-induced crystallization, onset of necking or other draw non-uniformity, onset of strain-hardening or to account for the development of various properties within the film. Typical break points include those for TDDR*, the range of 3 to 7 for strain-hardening in polyesters, and typical final draw values in the range of 4 to 10 or more.

The procedures for determining boundary trajectories for the present invention in the method of extrapolating backwards to lower TDDR from a chosen TDDR' may be used in an analogous method of extrapolating forward to higher TDDR from a chosen TDDR". Again, two constraining trajectories are formed, joined at the lowest chosen TDDR". A convenient value for TDDR" is the initial TDDR of unity. In this method, the constraining trajectory of minimum overfeed or U lies above the maximum overfeed curve. FIG. 19 actually exhibits an example of this method in which the hybrid curve 324 lies between the minimum overfeed constraint, curve 322, and the maximum overfeed constraint, curve 320.

Still another class of boundary trajectories can be defined and may, in some embodiments, be useful in suppressing residual wrinkles. Because the uniaxial condition in the absence of shear provides a principal MD stress of zero, it is anticipated, using finite strain analysis, that the principal MD stress will actually go into slight compression under these conditions. Using finite strain analysis and a Neo-Hookean elastic solid constitutive equation, it is discovered that a suitable criterion for preventing compressive stresses may optionally be given by the following equation:

$$((TDDR)(MDDR))^{-4} + ((TDDR)(MDDR))^{2} - (TDDR)^{-2} - (MDDR)^{-2} - \sin^{2}(\theta)((TDDR)(MDDR))^{-2} = 0$$

where MDDR is the cosine of the divergence angle. This optional method of the present invention then specifies this class of boundary trajectories.

As indicated above, the film may be drawn out-of-plane using out-of-plane boundary trajectories, i.e. boundary trajectories that do not lie in a single Euclidean plane. There are innumerable, but nevertheless particular, boundary trajectories meeting relational requirements of this preferred embodiment of the present invention, so that a substantially uniaxial draw history may be maintained using out-of-plane boundary trajectories. The boundaries may be symmetrical, forming mirror images through a central plane, e.g. a plane comprising the initial center point between the boundary trajectories, the initial direction of film travel and the initial normal to the unstretched film surface. In this embodiment, the film may be drawn between the boundary trajectories along a cylindrical space manifold formed by the set of line segments of shortest distance between the two opposing boundary trajectories as one travels along these boundary trajectories at equal rates of speed from similar initial positions, i.e., colinear with each other and the initial center point. The trace of this ideal manifold on the central plane thus traces out the path of the film center for an ideal draw. The ratio of the distance along this manifold from the boundary trajectory to this central trace on the central plane to the original distance from the start of the boundary trajectory to the initial center point is the instantaneous nominal TDDR across the film spanning the boundary trajectories, i.e. the ratios of the half-distances between the current opposing points on the boundary trajectories and the half-distances between the initial positions of the opposing points on the boundary trajectories. As two opposing points move at constant and identical speeds along the opposing boundary trajectories, the corresponding center point on the central trace changes speed as measured along the arc of the central trace, i.e. the curvilinear MD. In particular, the central trace changes in proportion with the projection of the unit tangent of the boundary trajectory on the unit tangent of the central trace.

The classes of trajectories described above are illustrative and should not be construed as limiting. A host of trajectory classes are considered to lie within the scope of the present invention. As indicated above, the primary stretching region can contain two or more different zones with different stretching conditions. For example, one trajectory from a first class of trajectories can be selected for an initial stretching zone and another trajectory from the same first class of trajectories or from a different class of trajectories can be selected for each of the subsequent stretching zones.

The present invention encompasses all nearly uniaxial boundary trajectories comprising a minimum value of U of about 0.7, more preferably approximately 0.75, still more preferably about 0.8 and even more preferably about 0.85. The minimum U constraint may be applied over a final portion of the draw defined by a critical TDDR preferably of about 2.5, still more preferably about 2.0 and more preferably about 1.5. In some embodiments, the critical TDDR can be 4 or 5. Above a critical TDDR, certain materials, e.g. certain monolithic and multilayer films comprising orientable and birefringent polyesters, may begin to lose their elasticity or capability of snap back because of the development of structure such as strain-induced crystallinity. The critical TDDR may coincide with a variety of material and process (e.g. temperature and strain rate) specific events such as the critical TDDR for the onset of strain-induced crystallization. The minimum value of U above such a critical TDDR can relate to an amount of non-uniaxial character set into the final film.

A variety of boundary trajectories are available when U is subuniaxial at the end of the stretching period. In particular, useful boundary trajectories include coplanar trajectories where TDDR is at least 5, U is at least 0.7 over a final portion of the stretch after achieving a TDDR of 2.5, and U is less than 1 at the end of the stretch. Other useful trajectories include coplanar and non-coplanar trajectories where TDDR is at least 7, U is at least 0.7 over a final portion of the stretch after achieving a TDDR of 2.5, and U is less than 1 at the end of the stretch. Useful trajectories also include coplanar and non-coplanar trajectories where TDDR is at least 6.5, U is at least 0.8 over a final portion of the stretch after achieving a TDDR of 2.5, and U is less than 1 at the end of the stretch. Useful trajectories include coplanar and non-coplanar trajectories where TDDR is at least 6, U is at least 0.9 over a final portion of the stretch after achieving a TDDR of 2.5, and U is less than 1 at the end of the stretch.

Useful trajectories also include coplanar and non-coplanar trajectories where TDDR is at least 7 and U is at least 0.85 over a final portion of the stretch after achieving a TDDR of 2.5.

In some embodiments, a small level of MD tension is introduced into the stretching process to suppress wrinkling. Generally, although not necessarily, the amount of such MD tension increases with decreasing U.

In some embodiments, it is useful to increase the tension as the draw proceeds. For example, a smaller value of U earlier in the draw may tend to set more non-uniaxial character into the final film. Thus it may be advantageous to combine the attributes of various trajectory classes into composite trajectories. For example, a uniaxial parabolic trajectory may be preferred in the earlier portions of the draw, while the later portions of the draw may converge on a different trajectory. In another arrangement, U may be taken as a non-increasing function with TDDR. In still another arrangement, the overfeed, F, may be a non-increasing function with TDDR after a critical draw ratio of, for example, 1.5, 2, or 2.5.

The uniaxial parabolic trajectory assumes a uniform spatial drawing of the film. Good spatial uniformity of the film can be achieved with many polymer systems with careful control of the crossweb and downweb caliper (thickness) distribution of the initial, undrawn film or web, coupled with the careful control of the temperature distribution at the start of and during the draw. For example, a uniform temperature distribution across the film initially and during draw on a film of initially uniform caliper should suffice in most cases. Many polymer systems are particularly sensitive to non-uniformities and will draw in a non-uniform fashion if caliper and temperature uniformity are inadequate. For example, polypropylenes tend to "line draw" under monoaxial drawing. Certain polyesters, notably polyethylene naphthalate, are also very sensitive.

Non-uniform film stretching can occur for a variety of reasons including, for example, non-uniform film thickness or other properties, non-uniform heating, etc. In many of these instances, portions of the film near the gripping members draws faster than that in the center. This creates an MD tension in the film that can limit ability to achieve a final uniform MDDR. One compensation for this problem is to modify the parabolic or other uniaxial trajectory to present a lower MDDR. In other words, MDDR<$(TDDR)^{-1/2}$ for a portion or all of the draw.

In one embodiment, a modified parabolic or other uniaxial trajectory is selected in which MDDR<$(TDDR)^{-1/2}$, corresponding to a larger divergence angle, for all of the draw. In at least some instances, this condition can be relaxed because a U value of less than unity is acceptable for the application. In such instances, a modified parabolic or other uniaxial trajectory is selected in which (0.9)MDDR<$(TDDR)^{-1/2}$.

In another embodiment, a modified parabolic or other uniaxial trajectory is selected in which MDDR<$(TDDR)^{-1/2}$ for an initial stretching zone in which the TDDR is increase by at least 0.5 or 1. A different trajectory is then maintained for the remainder of the draw. For example, a later stretching zone (within the stretching region 34) would have a parabolic or other uniaxial trajectory in which MDDR is equal to or approximately equal to (within ±5% and, preferably, within ±3%) $(TDDR)^{-1/2}$. As an example, the initial stretching zone can accomplish a TDDR level up to a desired value. This desired value is typically no more than 4 or 5. The later stretching zone can then increase the TDDR from the desired value of the initial stretching zone (or from a higher value if there are intervening stretching zones). Generally, the later stretching zone is selected to increase the TDDR value by 0.5 or 1 or more.

Again, in at least some instances, the MDDR and TDDR relationship can be relaxed because a U value of less than unity is acceptable for the application. In such instances, the modified parabolic or other uniaxial trajectory of the initial stretching zone is selected in which (0.9)MDDR<$(TDDR)^{-1/2}$.

Returning to FIG. 5, the apparatus typically includes a post-conditioning region 36. For example, the film may be set in zone 48 and quenched in zone 50. In some embodiments, quenching is performed outside the stretching apparatus. Typically, the film is set when at least one component of the film, e.g. one layer type in a multilayer film, reaches a temperature below the glass transition. The film is quenched when all components reach a temperature level below their glass transitions. In the embodiment illustrated in FIG. 5, a takeaway system is used to remove the film from the primary stretching region 34. In the illustrated embodiment, this takeaway system is independent of (i.e., not directly connected to) the tracks upon which the film was conveyed through the primary stretching region. The takeaway system can use any film conveyance structures such as tracks 140, 141 with gripping members such as, for example, opposing sets of belts or tenter clips.

Figure 10:
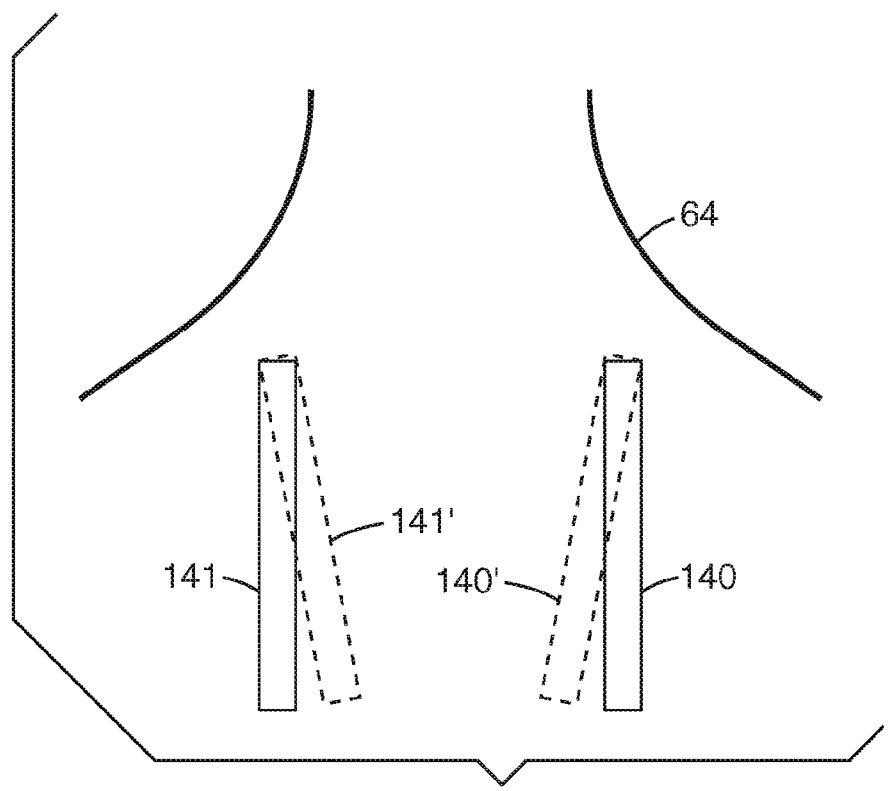
FIG. 10 is a schematic illustration of one embodiment of a take-away system for a stretching apparatus according to the invention.

In some embodiments as illustrated in FIG. 10, TD shrinkage control can be accomplished using tracks 140', 141' which are angled (as compared to parallel tracks 140, 141 that could be used in other embodiments of a suitable take-away system). For example, the tracks of the take-away system can be positioned to follow a slowly converging path (making an angle θ of no more than about 5°) through at least a portion of the post conditioning region to allow for TD shrinkage of the film with cooling. The tracks in this configuration allow the control of TD shrinkage to increase uniformity in the shrinkage. In other embodiments, the two opposing tracks can be diverging typically at an angle of no more than about 3° although wider angles can be used in some embodiments. This can be useful to increase the MD tension of the film in the primary stretching region to, for example, reduce property non-uniformity such as the variation of principal axes of refractive index across the film.

Figure 11:
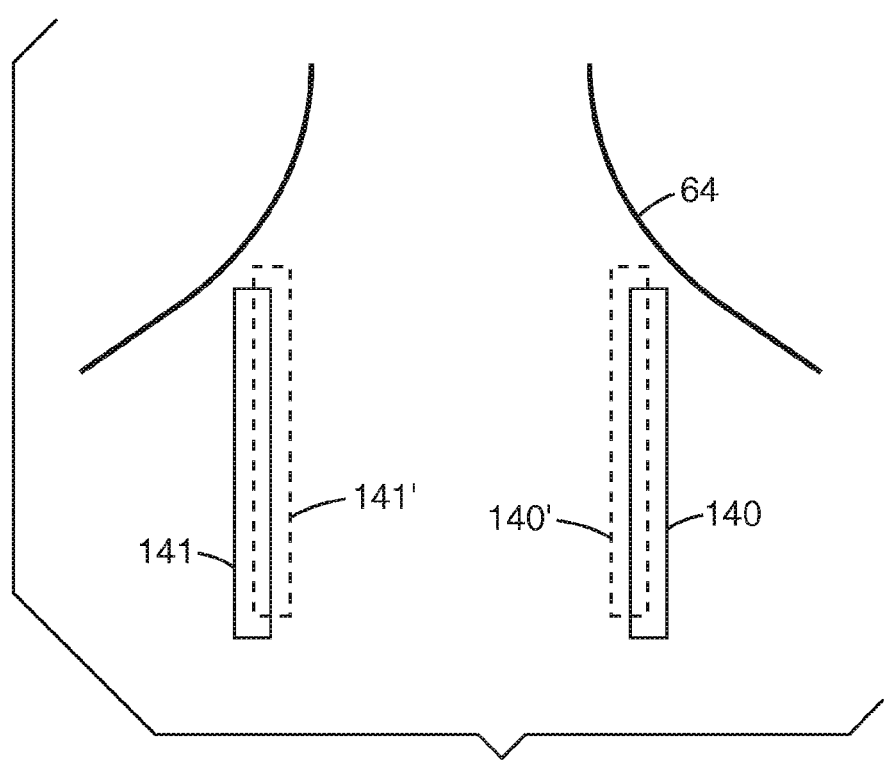
FIG. 11 is a schematic illustration of another embodiment of a take-away system for a stretching apparatus according to the invention.

In some embodiments, the position of the take-away system can be adjustable to vary the position along the stretching apparatus at which the take-away system grips the film, as illustrated in FIG. 11. This adjustability provides one way to control the amount of stretching to which the film is subjected. Film received by tracks 140', 141' of a take-away system earlier in the draw (shown by dotted lines in FIG. 11) will generally have a smaller TDDR than would film received by a tracks 140, 141 of a take-away system positioned later in the draw (shown in solid lines in FIG. 11). The take-away system can also, optionally, be configured to allow adjustment in the distance between the opposing tracks of the take-away system. In addition, the take-away system can also, optionally, be configured to allow adjustment in the length of the take-away system.

Figure 12:
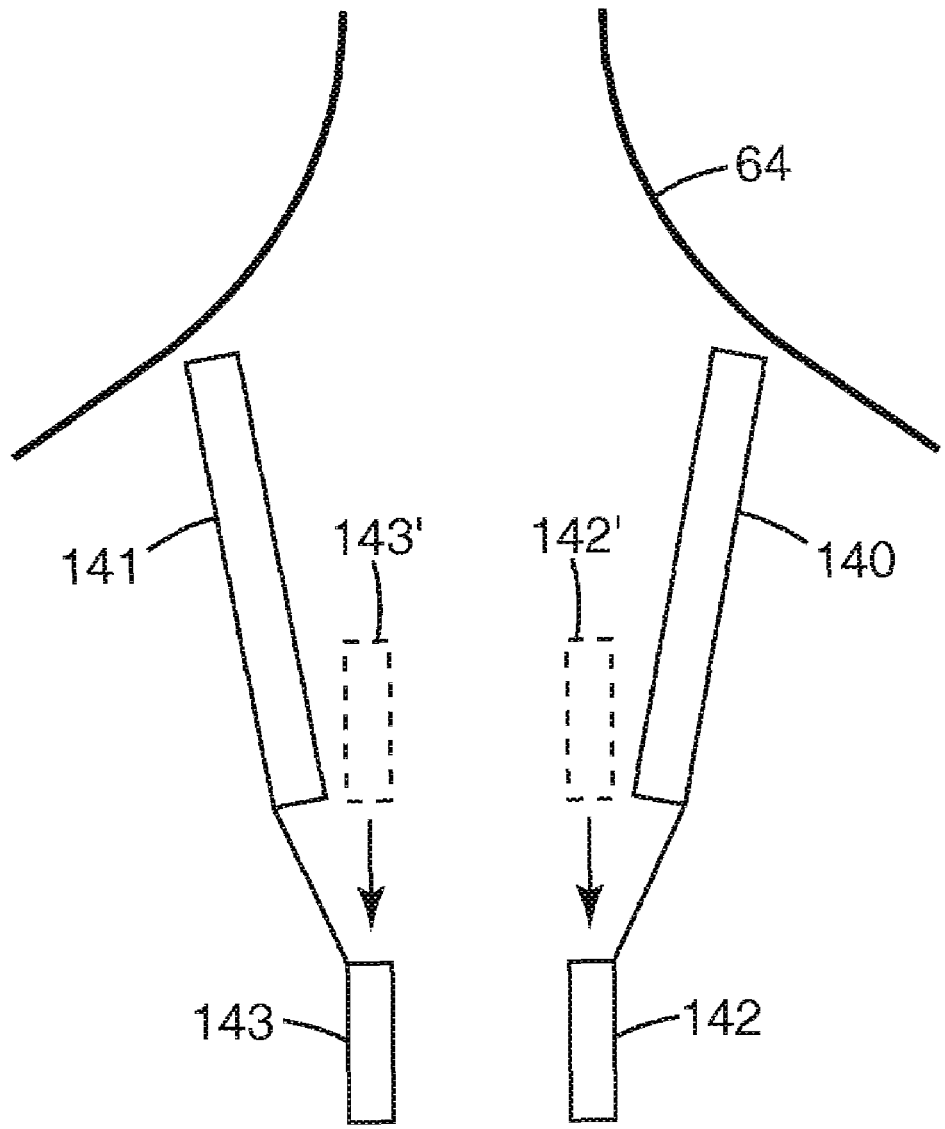
FIG. 12 is a schematic illustration of a third embodiment of a take-away system for a stretching apparatus according to the invention.

Another example of a possible take-away system includes at least two different regions with separated tracks 140, 141, 142, 143. These regions can be formed using two separate sets 140, 141 and 142, 143 of opposing tracks as illustrated in FIG. 12. In one embodiment, illustrated in FIG. 12, the first region can include tracks 140, 141 that are disposed at a convergence angle to provide TD shrinkage control and the tracks 142, 143 in the second regions can be parallel. In other embodiments, the opposing tracks of the two different regions can be set at two different convergence angles to provide TD shrinkage control, as described above, or the first region can have parallel tracks and the second region have tracks disposed at a convergence angle to provide TD shrinkage control. Alternatively or additionally, the two different tracks can be set at two different takeaway speeds to decouple the primary stretching region from a takeaway region that applies tension to remove wrinkles.

In one embodiment a the take-away system illustrated in FIG. 12, the tracks 142', 143' are nested within the opposing tracks 140, 141 prior to receiving the film. When the film is initially received by the opposing tracks 140, 141, the tracks 142, 143 move to the position illustrated in FIG. 12. In other embodiments, the opposing tracks 140, 141, 142, 143 are positioned as illustrated in FIG. 12 (i.e., not nested) in the absence of any film.

Figure 13:
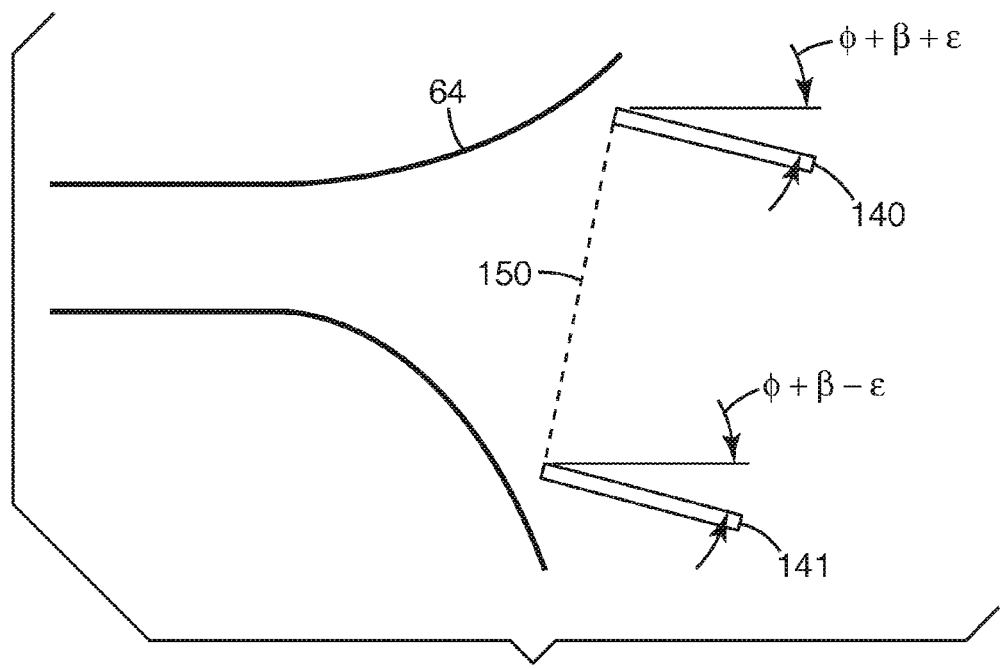
FIG. 13 is a schematic illustration of a fourth embodiment of a take-away system for a stretching apparatus according to the invention.

Another example of a take-away system is illustrated in FIG. 13. In this example, the tracks 140, 141 of the take-away system are angled with respect to the centerline of the film as the film is conveyed through the tracks 64 of the primary stretching region. The angle of the two opposing conveyance mechanisms can be the same, for example, an angle $\beta$ or the angle can be different and can be described as $\beta+\epsilon$ for one track and $\beta-\epsilon$ for the other track. The angle $\epsilon$ would correspond to the converging or diverging angle described above to provide TD shrinkage control, etc. In some embodiments, the tracks 64 in the primary stretching zone can also be disposed at an angle $\phi$ and the tracks 140, 141 are angled at $\phi+\beta+\epsilon$ and $\phi+\beta-\epsilon$ as illustrated in FIG. 13. An angled take-away system, primary stretching zone, or both can be useful to provide films where the principal axis or axes of an property of the film, such as the refractive index axes or tear axis, is angled with respect to the film. In some embodiments, the angle that the take-away system makes with respect to the primary stretching zone is adjustable manually or mechanically using a computer-controlled driver or other control mechanism or both.

Figure 14:
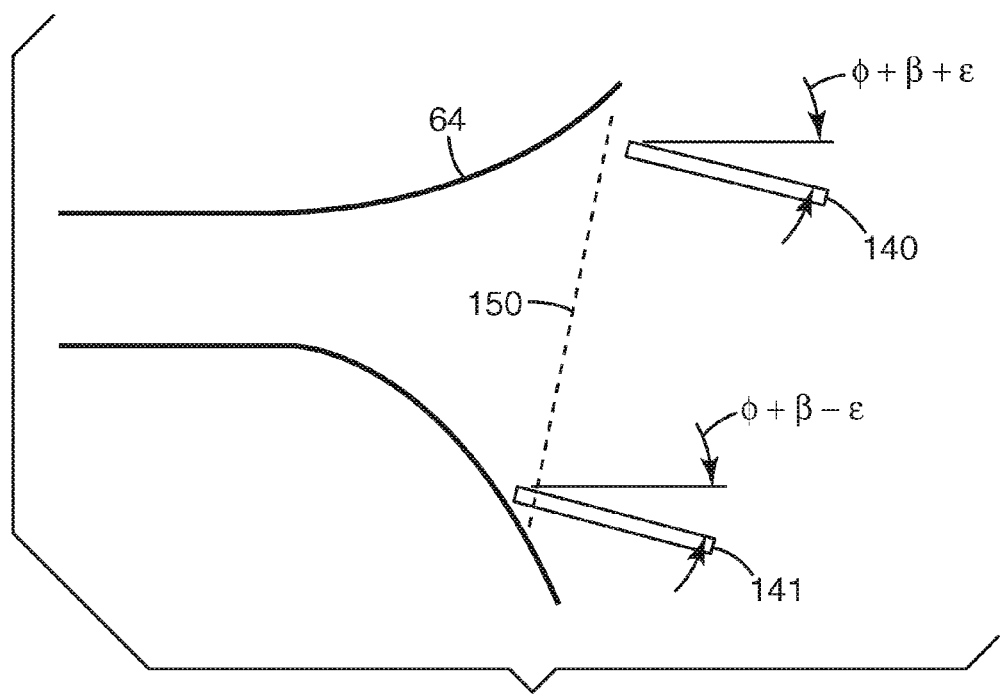
FIG. 14 is a schematic illustration of a fifth embodiment of a take-away system for a stretching apparatus according to the invention.

In some embodiments using an angled take-away system, the two opposing tracks are positioned to receive film having the same or substantially similar TDDR (where the dotted line indicates film at the same TDDR), as illustrated in FIG. 13. In other embodiments, the two opposing tracks 140, 141 are positioned to receive the film so that the TDDR is different for the two opposing tracks (the dotted line of FIG. 14 indicates film at the same TDDR), as illustrated in FIG. 14. This latter configuration can provide a film with properties that change over the TD dimension of the film.

Typically, the portions of the film that were held by the gripping members through the primary stretching region are removed. To maintain a substantially uniaxial draw throughout substantially all of the draw history (as shown in FIG. 5), at the end of the transverse stretch, the rapidly diverging edge portions 56 are preferably severed from the stretched film 48 at a slitting point 58. A cut can be made at 58 and flash or unusable portions 56 can be discarded.

Release of the selvages from a continuous gripping mechanism can be done continuously; however, release from discrete gripping mechanisms, such as tenter clips, should preferably be done so that all the material under any given clip is released at once. This discrete release mechanism may cause larger upsets in stress that may be felt by the drawing web upstream. In order to assist the action of the isolating takeaway device, it is preferred to use a continuous selvage separation mechanism in the device, e.g. the "hot" slitting of the selvage from the central portion of a heated, drawn film.

The slitting location is preferably located near enough to the "gripline", e.g. the isolating takeaway point of first effective contact by the gripping members of the take-away system, to minimize or reduce stress upsets upstream of that point. If the film is slit before the film is gripped by the take-away system, instable takeaway can result, for example, by film "snapback" along TD. The film is thus preferably slit at or downstream of the gripline. Slitting is a fracture process and, as such, typically has a small but natural variation in spatial location. Thus it may be preferred to slit slightly downstream of the gripline to prevent any temporal variations in slitting from occurring upstream of the gripline. If the film is slit substantially downstream from the gripline, the film between the takeaway and boundary trajectory will continue to stretch along TD. Since only this portion of the film is now drawing, it now draws at an amplified draw ratio relative to the boundary trajectory, creating further stress upsets that could propagate upstream, for example, undesirable levels of machine direction tension propagating upstream.

The slitting is preferably mobile and re-positionable so that it can vary with the changes in takeaway positions needed to accommodate variable final transverse draw direction ratio or adjustment of the position of the take-away system. An advantage of this type of slitting system is that the draw ratio can be adjusted while maintaining the draw profile simply by moving the take-away slitting point 58.

A variety of slitting techniques can be used including a heat razor, a hot wire, a laser, a focused beam of intense IR radiation or a focused jet of heated air. In the case of the heated jet of air, the air may be sufficiently hotter in the jet to blow a hole in the film, e.g. by heat softening, melting and controlled fracture under the jet. Alternatively, the heated jet may merely soften a focused section of the film sufficiently to localize further drawing imposed by the still diverging boundary trajectories, thus causing eventual fracture downstream along this heated line through the action of continued film extension. The focused jet approach may be preferred in some cases, especially when the exhaust air can be actively removed, e.g. by a vacuum exhaust, in a controlled fashion to prevent stray temperature currents from upsetting the uniformity of the drawing process. For example, a concentric exhaust ring around the jet nozzle can be used. Alternatively, an exhaust underneath the jet, e.g. on the other side of the film, can be used. The exhaust may be further offset or supplemented downstream to further reduce stray flows upstream into the drawing zone.

Another attribute of the take-away system is a method of speed and or MD tension control so that the film can be removed in a manner compatible with the output speed. This take-away system could also be used to pull out any residual wrinkles in the film. The wrinkles could be initially pulled out during start up by a temporary increase in the takeaway speed above the output speed of the final, released portion of the drawn film, or the wrinkles could be pulled out by a constant speed above the output film MD speed during continuous operation, e.g. in the case of a super-uniaxial draw in the final portion of draw. The speed of the takeaway can also be set above the MD velocity of the film along the boundary trajectories at the gripline. This can be used to alter the properties of the film. This over-speed of the takeaway can also reduce the final value of U and is thereby limited by this consideration in the context of the final end use of the film.

The process also includes a removal portion in region 38. Optionally a roller 65 may be used to advance the film, but this may be eliminated. Preferably the roller 65 is not used as it would contact the stretched film 52 with the attendant potential to damage the stretched film. Another cut 60 may be made and unused portion 61 may be discarded. Film leaving the take-away system is typically wound on rolls for later use. Alternatively, direct converting may take place after take away.

Figure 17:
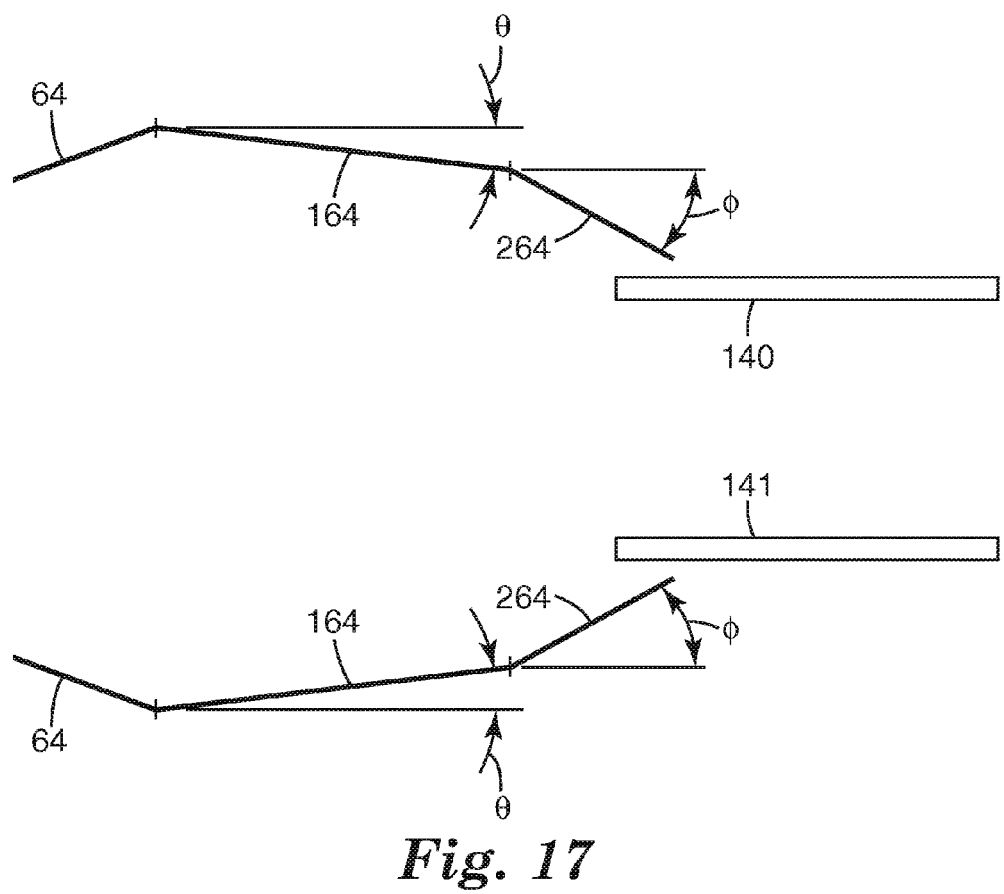
FIG. 17 is a schematic illustration of one embodiment of a take-away system, according to the invention, for using in, for example, a conventional stretching apparatus such as that illustrated in FIG. 1.

The principles of MD and TD shrinkage control described above can also be applied to other stretching apparatuses including the conventional tenter configuration illustrated in FIG. 1. FIG. 17 illustrated an embodiment in which the tracks 64 from a primary stretching region (such as the linear diverging tracks illustrated in FIG. 1) continue into or through a portion of a post-conditioning region. The film is then optionally captured by an isolated takeaway system 140, 141, if desired. The continuation of the tracks 64 can be used to cool the film and allow for shrinkage of the film. In some embodiments, the continued tracks 164 follow a slowly converging path (making an angle θ of no more than about 5°) through at least a portion of the post conditioning region to allow for TD shrinkage of the film with cooling. The tracks in this configuration allow the control of TD shrinkage to increase uniformity in the shrinkage. In some embodiments, the tracks 264 follow a more aggressively converging path (making an angle φ of at least 15°, and typically in the range of 20° and 30°) through at least a portion of the post conditioning region to provide MD shrinkage control of the film with cooling. In some embodiments as illustrated in FIG. 17, the post conditioning region includes both slowly converging tracks 164 and more aggressively converging tracks 264. In other embodiments, only one set of tracks 164 and tracks 264 is used.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

The invention claimed is:

1. An apparatus for stretching a film, the apparatus comprising:
   a plurality of gripping elements to hold opposing ends of a film;
   opposing tracks along which the plurality of gripping elements travel, the opposing tracks defining a primary stretching region in which the tracks generally diverge to stretch a film held by the gripping elements, wherein each of the opposing tracks in the primary stretching region comprises at least one continuous rail extending the length of the track through the primary stretching region; and
   at least one track shape controller coupled to at least one of the continuous rails within the primary stretching region, wherein the track shape controller is capable of applying a force to the continuous rail to modify a shape of the track in the primary stretching region, the track comprising a generally curvilinear segment and a generally linear segment within the primary stretching region.

2. The apparatus of claim 1, wherein at least one track shape controller is coupled to each continuous rail of at least one of the opposing tracks.

3. The apparatus of claim 1, wherein a plurality of track shape controllers is coupled to each of the continuous rails.

4. The apparatus of claim 1, wherein at least one of the tracks comprises a fixed control point that does not move when the track shape controllers apply force to modify the shape of the track.

5. The apparatus of claim 4, wherein the fixed control point is positioned on the track prior, relative to a directional flow of film through the apparatus, to any track shape controller coupled to the track.

6. The apparatus of claim 4, wherein the fixed control point is positioned on the track after, relative to the directional flow of film through the apparatus, at least one track shape controller coupled to the track.

7. The apparatus of claim 1, wherein the continuous rail has a cross-sectional area that varies along a length of the track.

8. The apparatus of claim 7, wherein the continuous rail is monotonically tapered along the length of the track.

9. The apparatus of claim 7, wherein the cross-sectional area of the continuous rail decreases along the length of the track.

10. The apparatus of claim 1, wherein an equilibrium shape of the continuous rail corresponds to a shape in which no track shape controller applies force to modify the shape of the continuous rail and the equilibrium shape of the continuous rail is parabolic.

11. An apparatus for stretching a film, the apparatus comprising:
    a plurality of gripping elements to hold opposing ends of a film; and
    opposing tracks along which the plurality of gripping elements travel, the opposing tracks defining a primary stretching region in which the tracks generally diverge to stretch a film held by the gripping elements, wherein each of the opposing tracks in the primary stretching region is formed between at least two continuous rails extending the length of the track through the primary stretching region, the track comprising a generally curvilinear segment within the primary stretching region.

12. The apparatus of claim 11 further comprising a plurality of bearings positioned between the continuous rails of each opposing track.

13. The apparatus of claim 11 wherein the track is generally curvilinear within the primary stretching region.

14. The apparatus of claim 11 wherein the track comprises a generally curvilinear segment and a generally linear segment within the primary stretching region.

15. The apparatus of claim 11 further comprising at least one track shape controller coupled to at least one of the continuous rails within the primary stretching region, wherein the track shape controller is capable of applying a force to the continuous rail to modify a shape of the track in the primary stretching region.

16. The apparatus of claim 15, wherein at least one track shape controller is coupled to each continuous rail of at least one of the opposing tracks.

17. The apparatus of claim 15, wherein a plurality of track shape controllers is coupled to each of the continuous rails.

18. The apparatus of claim 15, wherein at least one of the tracks comprises a fixed control point that does not move when the track shape controllers apply force to modify the shape of the track.

19. The apparatus of claim 11, wherein a continuous rail has a cross-sectional area that varies along a length of the track.

20. An apparatus for stretching a film, the apparatus comprising:

a plurality of gripping elements to hold opposing ends of a film;

opposing tracks along which the plurality of gripping elements travel, the opposing tracks defining a primary stretching region in which the tracks generally diverge to stretch a film held by the gripping elements, wherein each of the opposing tracks in the primary stretching region comprises at least one continuous rail extending the length of the track through the primary stretching region; and three or more track shape controllers coupled to at least one of the continuous rails within the primary stretching region, wherein the track shape controllers are capable of applying force to the continuous rail to modify a shape of the track in the primary stretching region, the track comprising a generally curvilinear segment within the primary stretching region.

* * * * *

UNITED STATES PATENT AND TRADEMARK OFFICE
CERTIFICATE OF CORRECTION

PATENT NO. : 7,316,558 B2
APPLICATION NO. : 11/461837
DATED : January 8, 2008
INVENTOR(S) : William W. Merrill It is certified that error appears in the above-identified patent and that said Letters Patent is hereby corrected as shown below:

Column 3,
Line 9, After "to" insert -- : --, therefor.

Line 13, After "to" insert -- : --, therefor.

Column 5,
Line 18, After "6,179,948" delete ":" and insert -- ; --, therefor.

Line 27, Delete "film." and insert -- film, --, therefor.

Line 28, Delete "flint" and insert -- film. --, therefor.

Column 12,
Line 8, Delete "$\rho^f$," and insert -- $\rho_f$, --, therefor.

Line 27, After " $U = \dfrac{\frac{1}{MDDR} - 1}{TDDR^{1/2} - 1}$ " insert -- . --.

Line 53, After " $U_f = \dfrac{\frac{1}{MDDR} - 1}{\left(\frac{TDDR}{\rho_f}\right)^{1/2} - 1}$ " insert -- . --.

Column 13,
Line 8, After "$x/x_0 = (1/4)(y/x_0)^2 + 1$" insert -- . --.

Line 54, After "equation" insert -- : --.

Column 15,
Line 22, After "$F = 1/(MDDR \times TDDR^{1/2})$" insert -- . --.

Line 54, After "e.g." insert -- : --.

UNITED STATES PATENT AND TRADEMARK OFFICE
CERTIFICATE OF CORRECTION

PATENT NO. : 7,316,558 B2
APPLICATION NO. : 11/461837
DATED : January 8, 2008
INVENTOR(S) : William W. Merrill It is certified that error appears in the above-identified patent and that said Letters Patent is hereby corrected as shown below:

Column 16,
Line 12, Delete "($F^{min}$)" and insert -- ($F_{min}$) --, therefor.

Line 58, After "by" insert -- : --.

Line 59, After "$x_1/x_0=(F^2(TDDR)-1)/(TDDR-1)$" insert -- . --.

Column 17,
Line 11, After "$MDDR=(TDDR(x_1/x_0)+(1-x_1/x_0))^{-1/2}$" insert -- . --.

Line 33, After "to" insert -- : --.

Column 23,
Line 9, After "embodiment" delete "a".

Signed and Sealed this

Fifteenth Day of July, 2008

JON W. DUDAS
*Director of the United States Patent and Trademark Office*